United States Patent [19]
Oguchi et al.

[11] Patent Number: 6,078,496
[45] Date of Patent: Jun. 20, 2000

[54] PORTABLE COMPUTER WITH HINGED DETACHABLE BATTERY PACK

[75] Inventors: Toshiaki Oguchi, Kodaira; Asao Saito, Tokorozawa; Katsutoshi Mukaijima, Hoya; Hideo Nakamura, Higashiyamato, all of Japan

[73] Assignee: Citizen Watch Co., Ltd, Japan

[21] Appl. No.: 08/961,188

[22] Filed: Oct. 30, 1997

Related U.S. Application Data

[63] Continuation of application No. 08/762,130, Dec. 9, 1996, which is a continuation of application No. 08/524,310, Sep. 6, 1995, Pat. No. 5,583,744.

[30] Foreign Application Priority Data

| Sep. 6, 1994 | [JP] | Japan | 6-238435 |
| Sep. 6, 1994 | [JP] | Japan | 6-238437 |

[51] Int. Cl.⁷ .............. H05K 7/10; H05K 7/16; G06F 1/16
[52] U.S. Cl. .............. 361/683; 361/680; 429/98; 16/223
[58] Field of Search .............. 361/680, 681, 361/683; 16/337, 338, 339, 340, 342, 343, 223; 174/86; 429/96–100, 123

[56] References Cited

U.S. PATENT DOCUMENTS

| 5,107,401 | 4/1992 | Youn | 361/683 |
| 5,109,573 | 5/1992 | Sherman | 16/341 |
| 5,239,731 | 8/1993 | Lu | 16/340 |
| 5,243,549 | 9/1993 | Oshiba | 364/708.1 |
| 5,269,047 | 12/1993 | Lu | 16/340 |
| 5,293,300 | 3/1994 | Leung | 361/683 |
| 5,333,356 | 8/1994 | Katagiri | 16/340 |
| 5,390,075 | 2/1995 | English et al. | 361/683 |
| 5,473,794 | 12/1995 | Kobayashi | 16/337 |
| 5,583,744 | 12/1996 | Oguchi et al. | |
| 5,594,617 | 1/1997 | Foster et al. | 361/679 |
| 5,598,607 | 2/1997 | Katagiri | 16/340 |
| 5,632,066 | 5/1997 | Huong | 16/338 |
| 5,677,827 | 10/1997 | Yoshioka et al. | 361/683 |

FOREIGN PATENT DOCUMENTS

| 2145423 | 12/1990 | Japan . |
| 3119616 | 5/1991 | Japan . |
| 3207226 | 9/1991 | Japan . |
| 4131890 | 6/1992 | Japan . |
| 4242066 | 8/1992 | Japan . |
| 4299023 | 10/1992 | Japan . |
| 4131889 | 12/1992 | Japan . |
| 4355083 | 12/1992 | Japan . |
| 5003027 | 1/1993 | Japan . |
| 5087626 | 1/1993 | Japan . |
| 5010814 | 2/1993 | Japan . |
| 5030919 | 4/1993 | Japan . |
| 5064943 | 8/1993 | Japan . |

Primary Examiner—Lynn D. Feild
Attorney, Agent, or Firm—Hogan & Hartson, LLP

[57] ABSTRACT

A battery pack to be externally attached to a system body of a portable computer contains a plurality of batteries in two-rows. A groove is formed on that portion of the top of the battery pack which correspond to the region between the rows of batteries. A hinge unit for swingably supporting a display unit is provided on the rear end of the system body of the computer in a manner such that it is partially housed in the groove of the battery pack. With this arrangement, the computer is reduced in thickness. The battery pack, which is connected to the rear end of the system body, is rotatable relatively to the system body. During use of the computer, therefore, a keyboard can be slightly declined toward a user by rotating the battery pack to raise the rear end of the system body.

13 Claims, 33 Drawing Sheets

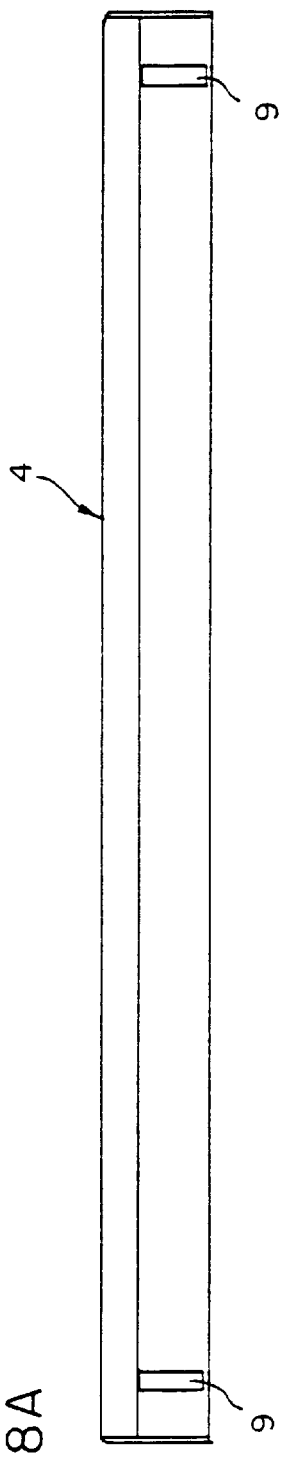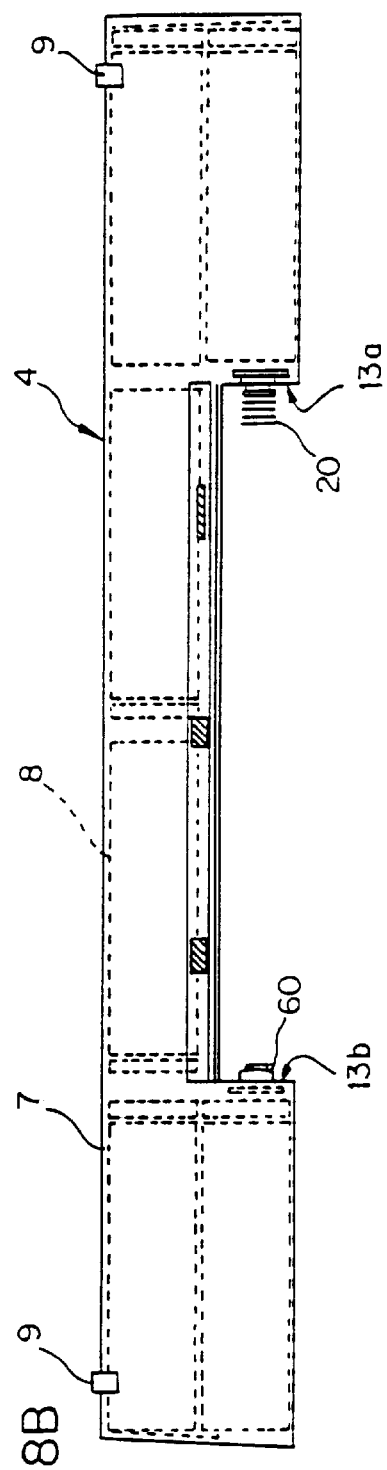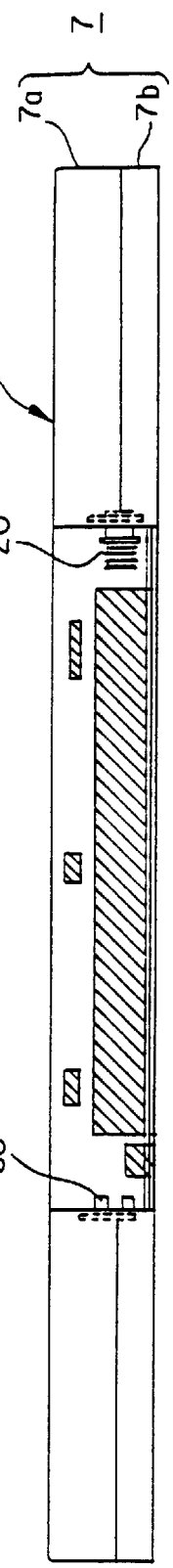

Fig. 19
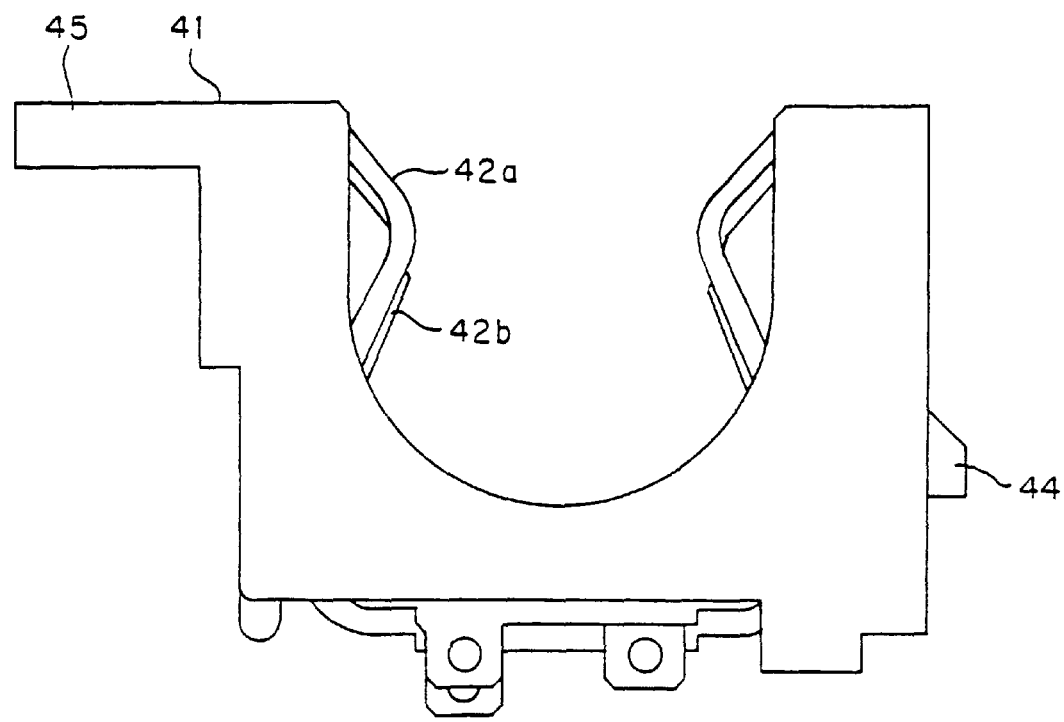
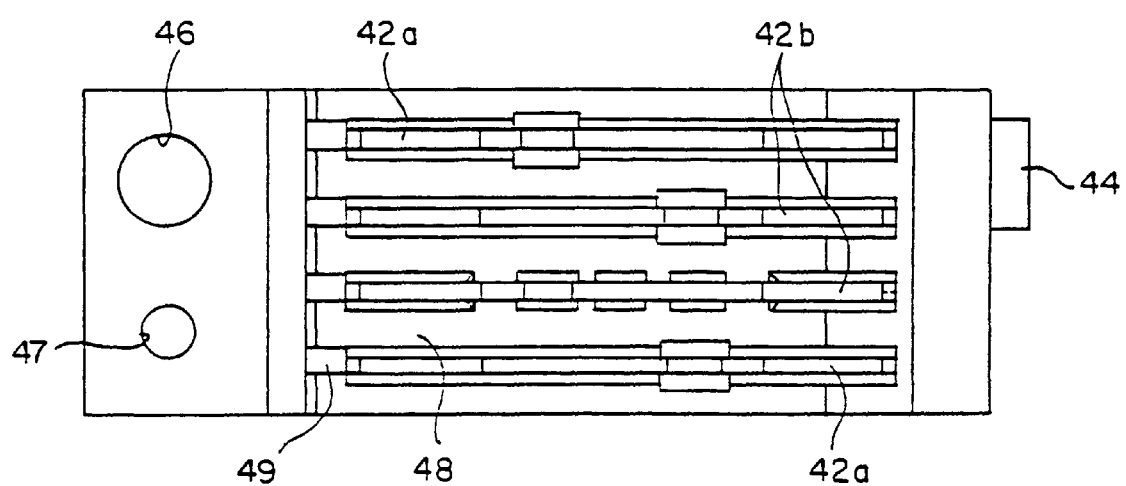
Fig. 20

Fig. 29A
Fig. 29B
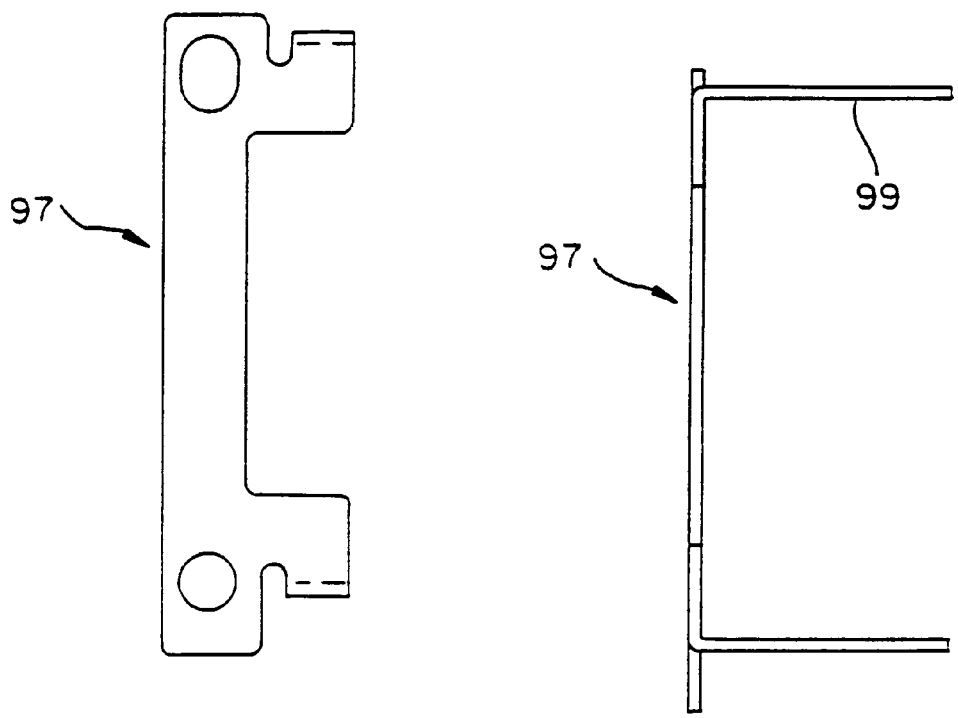
Fig. 30
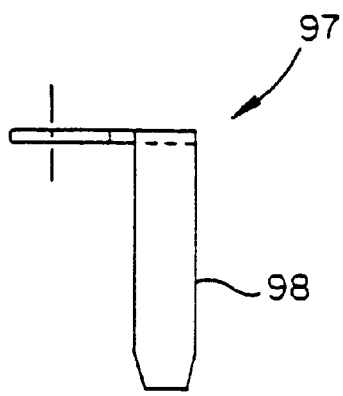

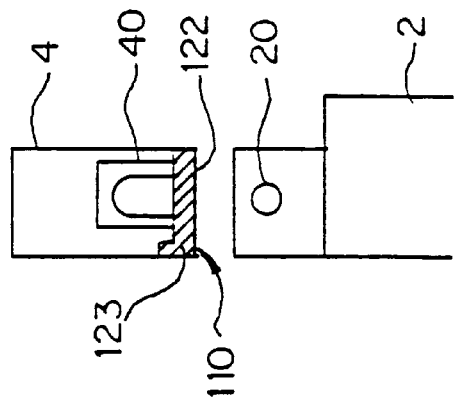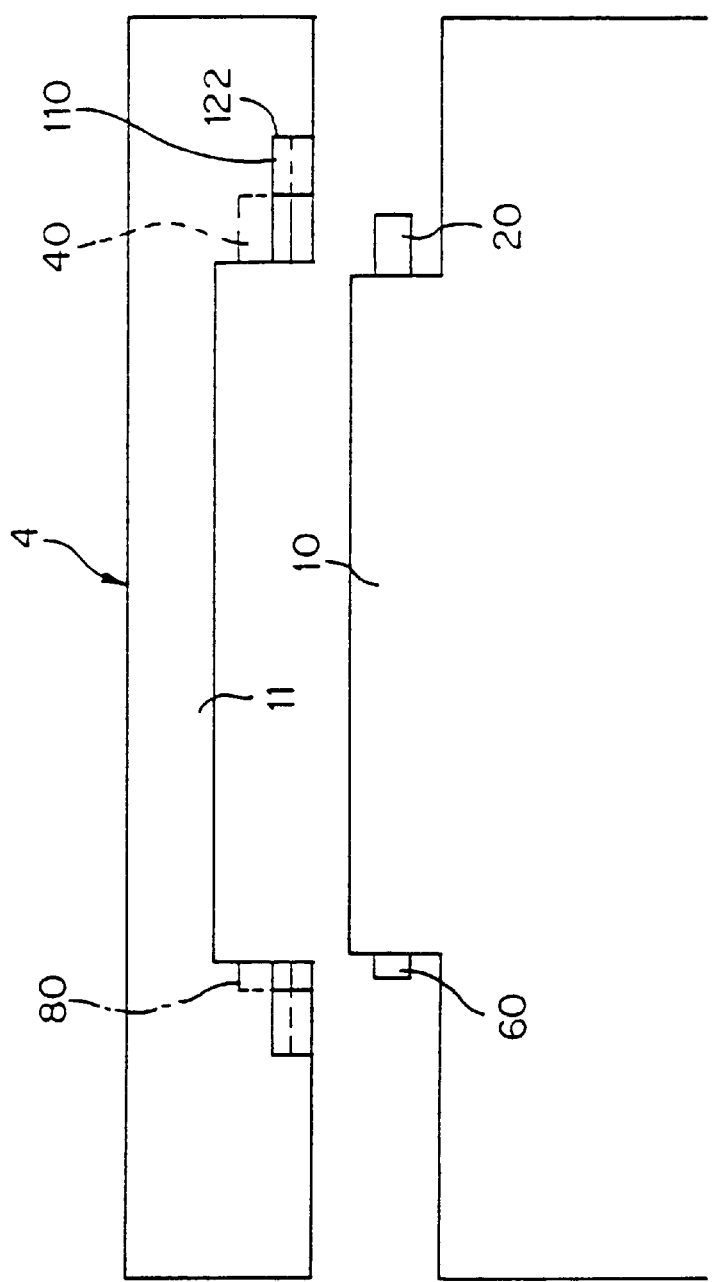

PORTABLE COMPUTER WITH HINGED DETACHABLE BATTERY PACK

This application is a continuation of application Ser. No. 08/762,130 filed Dec. 9, 1996, which is a continuation of application Ser. No. 08/524,310 field Sep. 6, 1995, issued Dec. 10, 1996 as U.S. Pat. No. 5,583,744.

BACKGROUND OF THE INVENTION

1. Field of the Invention

The present invention relates to a portable computer of a type such that a display formed of a liquid crystal or the like is swingably attached to a system body which includes a body unit, containing a processor, RAM, peripheral circuits, etc., and a keyboard module and the like.

2. Description of the Related Art

In general, a small-sized portable computer called a notebook type comprises a body unit, which contains therein a processor, RAM, peripheral circuits, etc., a keyboard module and the like, and besides, a swingable cover member which is furnished with a liquid crystal display (LCD). Prevailing liquid crystal displays use a back-lighting light source, and include a straight-pipe discharge lamp for use as a light source element, besides liquid crystal cells, segment substrate, polarizer plate, glass plate, etc. Inevitably, therefore, the cover member must be considerably thick all over.

The cover member, having the aforesaid parts therein, is swingably supported at its proximal end portion on the system body by means of a hinge mechanism. Since the hinge mechanism also requires a substantial thickness for a satisfactory strength, the respective thicknesses of those portions of the cover member, including the hinge mechanism, are substantially equal to or greater than the thickness of the display portion of the cover member.

In the computer of the type described above, a battery pack which contains a plurality of batteries is used as an operative or backup power source. In some cases, the batteries in the battery pack may be arranged in two or three rows, depending on the capacity required of the whole battery pack, capacity and size of each battery, etc.

The battery pack, containing the batteries in this manner, requires a substantial thickness and width, so that how to arrange the battery on the system body exerts a great influence on the reduction of the overall size of the computer, especially the thickness.

Referring now to FIGS. 49 and 50, therefore, two examples of the conventional arrangement of the battery pack on the system body will be described.

In FIG. 49, numeral 201 denotes a system body, which houses a body unit 203, which contains therein a processor, RAM, peripheral circuits, etc., a system control unit 203' including a keyboard module, track ball module, etc., and a battery pack 204. The system control unit 203' is situated substantially right over the body unit 203, while a hinge mechanism 206 for pivotally supporting a cover member 202 is located over the battery pack 204.

The battery pack 204, which is arranged side by side with the body unit 203, contains a plurality of (e.g., six) cylindrical batteries. In many cases, these batteries C1 and C2 are arranged in two rows, as shown in FIG. 49, in consideration of some restrictive conditions, including the size and capacity of each battery, length of the battery pack, etc. Naturally, therefore, the battery pack 204 has a height (thickness) not shorter than the diameter of each battery and a depth (in the horizontal direction of FIG. 49) twice the battery diameter or more. If the hinge mechanism 206 of the cover member 202 is situated right above the battery pack 204, as shown in FIG. 49, therefore, the overall thickness of the computer is D1+D2, where D1 and D2 are thicknesses of the system body 201 and the cover member 202, respectively.

With the recent technical innovation, the body unit 203 in the system body 201 and a liquid crystal in the cover member 202 have drastically been reduced in thickness. In consideration of the mechanical strength, on the other hand, the diameter of the hinge mechanism 206 cannot be reduced without limitation. Moreover, the diameter of the batteries C1 and C2 in the battery pack 204 cannot be freely restricted. If the battery diameter is reduced, then the overall capacity of the battery pack 204 will be lowered.

It may safely be said, therefore, that the thickness of the computer shown in FIG. 49 is settled substantially depending on the battery diameter (and hence the thickness of the battery pack 204) and the necessary strength of the hinge mechanism 206 for supporting the cover member 202. Thus, the computer of this type cannot be thinned all over without any restriction.

FIG. 50 shows another arrangement different from the one shown in FIG. 49. In FIGS. 49 and 50, like reference numerals refer to like or common elements. In the example shown in FIG. 50, the depth of the system body 201 is longer than the depth (L1) for the case of FIG. 49 by L2, that is, a little longer than that of the battery pack 204, and the pack 204 is housed in the marginal region. Accordingly, the hinge mechanism 206 which supports the cover member 202 cannot be situated right above the battery pack 204, so that the overall thickness (D3) of the computer can be restricted to a thickness, D1+D2, of FIG. 49 or less. Although the computer of FIG. 50 is thinner than the one shown in FIG. 49, however, it involves a drawback that its depth is extended by the margin (L2) corresponding to the depth of the battery pack.

In the conventional computer, moreover, the battery pack 204 is housed in the system body 201, and can be removed therefrom in some fashion if necessary. It cannot, however, be attached to and detached from the system body by simple operation.

OBJECT AND SUMMARY OF THE INVENTION

The object of the present invention is to provide a portable computer in which a battery pack is externally attached to a system body of the computer so that the computer is reduced in thickness, and further the battery pack is made rotatable relatively to the system body so that the whole system including a keyboard can be inclined at an angle to the surface on which the computer is placed.

According to the present invention, a groove is formed on at least part of a battery pack so as to extend in the longitudinal direction thereof. When the battery pack is attached to a system body of a computer, a hinge unit, which is provided on the system body and supports a cover member with a display for rotation, is partially housed in the groove of the battery pack. With this arrangement, the computer is reduced in overall thickness.

When the battery pack is supported on the system body, it can rotate relatively to the system body. When the battery pack is rotated, the system body tilts at an angle to the surface of a desk or the like on which the computer is placed. Accordingly, the keyboard or the like can be easily declined toward a user without specially using feet or legs. In particular, the system body has a lug which protrudes rearward from the rear end thereof, while the battery pack has a recess which is adapted to engage the lug of the system body. With this arrangement, the battery pack can be easily attached to and detached from the system body.

BRIEF DESCRIPTION OF THE DRAWINGS

The above and other objects, features, and advantages of the invention will be more apparent from the ensuing detailed description taken in connection with the accompanying drawings, in which:

FIGS. 8A, 8B and 8C are a rear view, plan view, and front view, respectively, of the battery pack of FIG. 5;

FIG. 19 is a view showing the rotating connector of FIG. 17 turned upside down;

FIG. 20 is a bottom view showing the rotating connector of FIG. 17 turned upside down;

FIGS. 29A and 29B are a plan view and a side view, respectively, of a hinge backup to be in engagement with the hinge of FIG. 27B;

FIG. 30 is a front plan view of the hinge backup of FIG. 29A;

FIGS. 48A and 48b are a plan view and a side view, respectively, showing the battery pack of FIG. 7 on the edge of being attached to the system body;

DETAILED DESCRIPTION OF THE PREFERRED EMBODIMENTS

Figure 1:
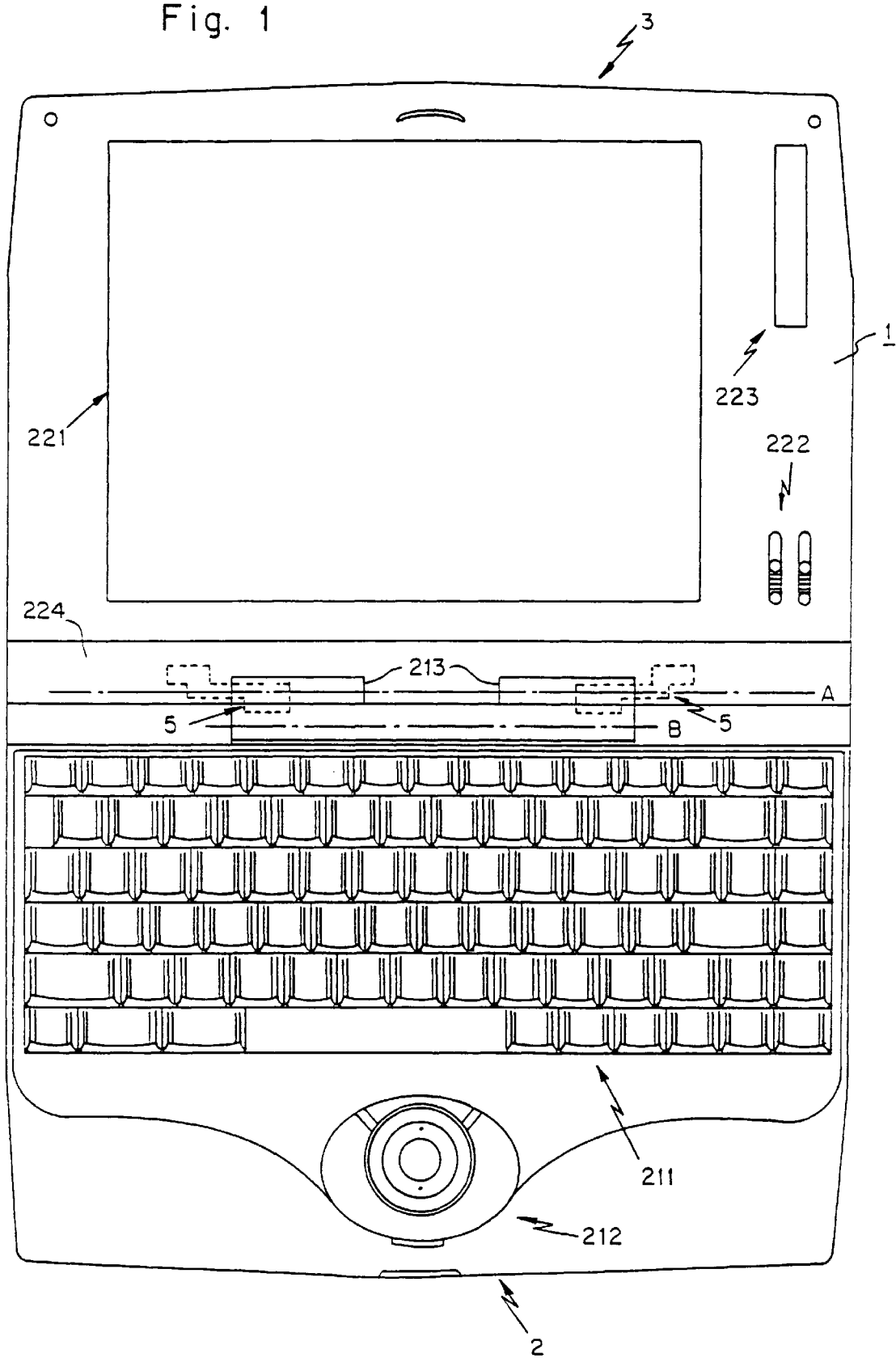
FIG. 1 is a top view of a portable computer according to a first embodiment of the invention with its cover member open.
Figure 2:
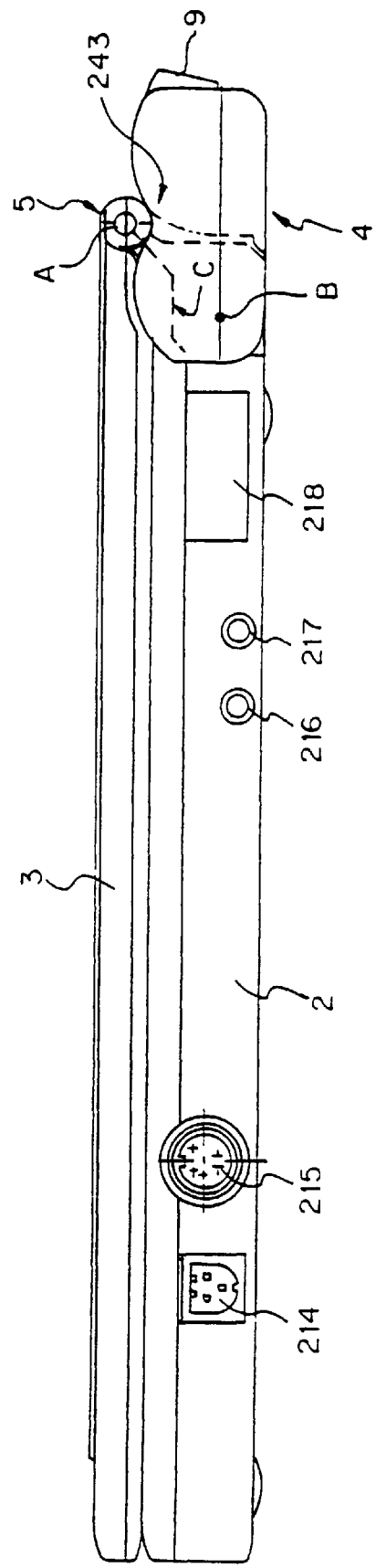
FIG. 2 is a side view of the computer shown in FIG. 1 with its cover member closed.
Figure 3:
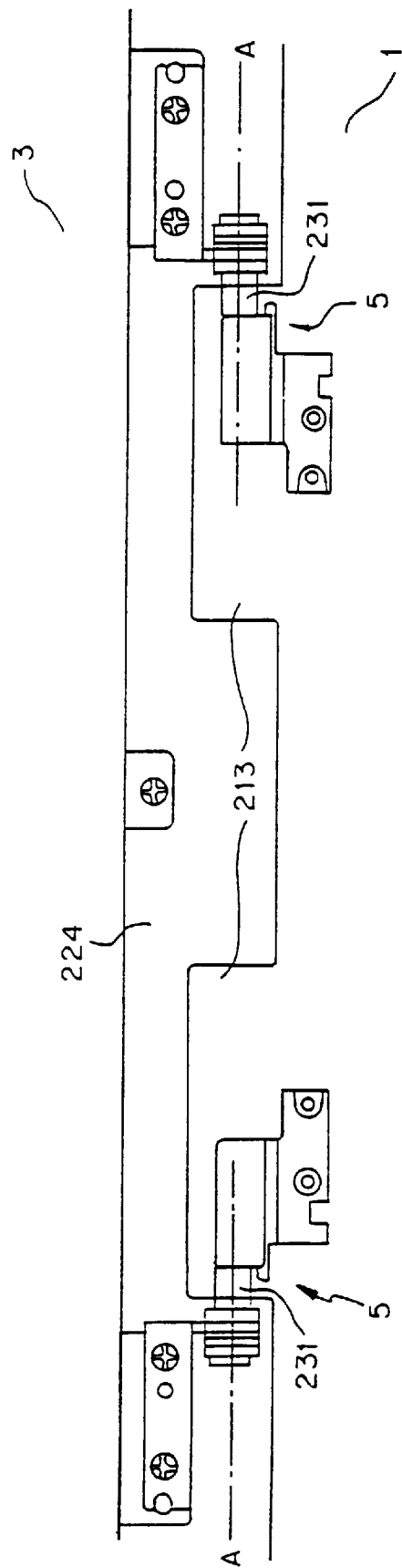
FIG. 3 is a partial enlarged view of a hinge unit which supports the cover member of the computer shown in FIG. 1.

Referring first to FIGS. 1 to 3, a first embodiment of the present invention will be described.

In FIG. 1, there is shown a portable computer 1 in a state such that its cover member, which is furnished with a display, is open. A keyboard 211 is located ranging from the central portion of a system body 2 to the rear portion thereof, while a track ball unit 212 is provided on the front portion of the body 2. The system body 2 contains therein a processor, RAM, peripheral circuits, etc., which are not shown in FIG. 1.

On the other hand, a cover member (hereinafter referred to as "display unit") 3, which is provided with a liquid crystal display 221 in the center, has a shape and size such that it entirely overlaps the system body 2. Liquid crystal cells, segment substrate, polarizer plate, glass plate, straight-pipe discharge lamp, etc. (not shown) are arranged behind and around the screen of the display 221. Attached to one side portion of the liquid crystal display 221, moreover, are a screen control unit 222 for adjusting the brightness, contrast, etc. of the liquid crystal display 221 and a small-sized auxiliary liquid crystal display 223 which graphically indicates the operating state of the system.

Batteries used in the computer 1 are contained in an externally attached battery pack 4. As shown in FIG. 2, the battery pack 4 is connected to the system body 2 in a manner such that it is pivotally supported on the rearmost portion of the body 2 by means of a hinge mechanism (indicated only as an axis position B). The externally attached battery pack 4 can be easily removed from the system body 2.

As shown in FIG. 2, the battery pack 4 has a thickness (vertical length in FIG. 2) a little greater than that of the system body 2 and a depth (horizontal length in FIG. 2) about twice its thickness, and can contain the batteries in two rows.

The underside of the battery pack 4 hinged by means of the hinge mechanism, as indicated by full line in FIG. 2, is flush with that of the system body 2. The distance between the axis B indicative of the position of the hinge mechanism and the underside of the battery pack 4 is shorter than the distance between the axis B and the rear end face of the pack 4 (the face to which rubber feet 9 are attached). When the battery pack 4 is rotated 90° in the clockwise direction around the axis B, therefore, the rubber feet 9 come into contact with a setting surface (e.g., top surface of a desk), thereby lifting the rear portion of the system body 2. In this state, the keyboard 211 of the computer 1 is somewhat inclined with respect to the desk top surface. Since the rubber feet 9 are interposed between the battery pack 4 and the desk top surface, moreover, the pack 4 never slips on the desk during use of the computer 1.

As shown in FIG. 2, the top surface of the battery pack 4 is formed with a groove 243 which extends in the transverse direction of the pack 4 (or at right angles to the drawing plane of FIG. 2) in the center with respect to the depth direction thereof. Although the groove 243 thus forms a constricted portion in the center of the battery pack 4, it constitutes no hindrance to the storage of the batteries which have a circular cross section each. Thus, the batteries are housed in the battery pack 4 so as to be situated in front and in the rear of the groove 243.

On the other hand, a hinge unit 5, which pivotally supports the display unit 3, is arranged in a manner such that its axis A extends in the transverse direction of the battery pack 4 right over and along the groove 243 of the pack 4, as shown in FIG. 2. Referring now to the partial enlarged view of FIG. 3, the hinge unit 5 will be described. A pair of overhangs 213 protrude rearward from the rearmost portion of the system body 2. Left- and right-hand hinge pivots 231 are attached to the left- and right-hand overhangs 213, respectively. The two hinge pivots 231 share the axis A in common. The display unit 3 is swingably supported on the system body 2 in a manner such that a mounting portion attached to a proximal end portion 224 of the display unit 3 is caused to engage the left- and right-hand hinge pivots 231.

Figure 49:
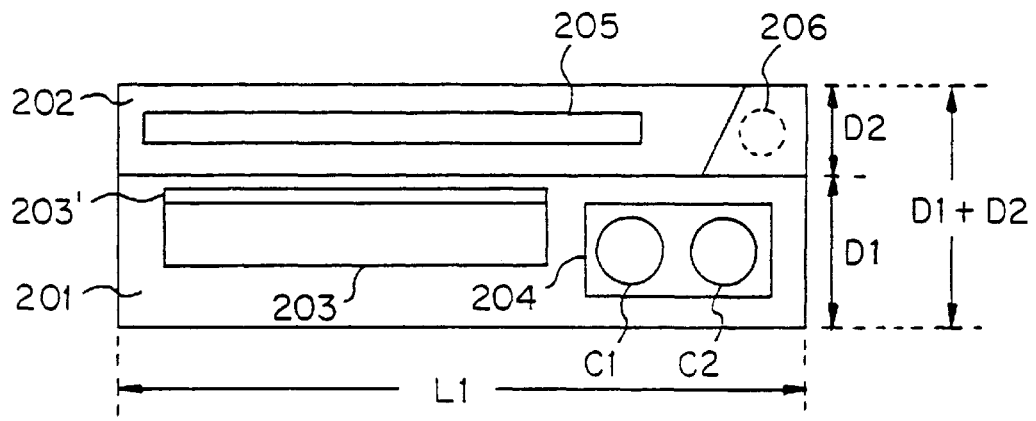
FIG. 49 is a schematic view for illustrating an example of a hinge unit for pivotally supporting a cover member of a conventional computer.
Figure 50:
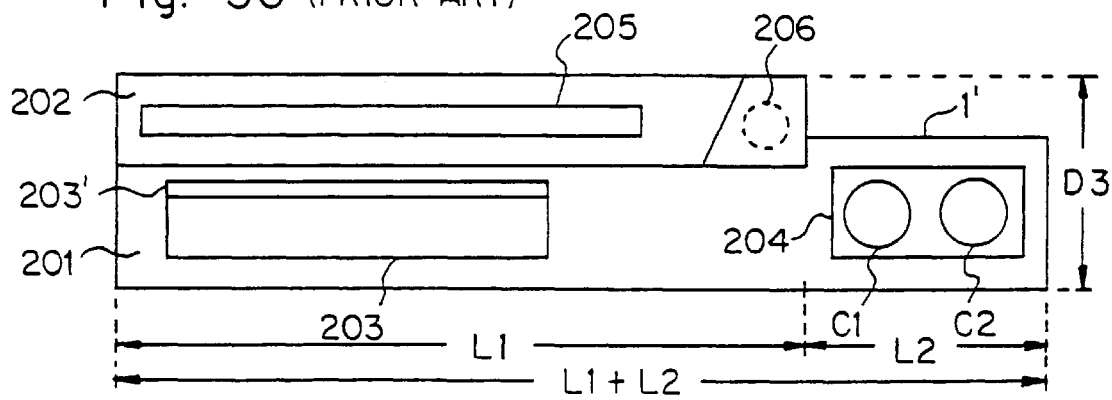
FIG. 50 is a schematic view for illustrating another example of the hinge unit for pivotally supporting a cover member in another conventional computer.

With this arrangement, the hinge unit 5, which is composed of the hinge pivots 231 and the mounting portion in engagement therewith, can be partially housed in the groove 243 of the battery pack 4, as shown in FIG. 2. Accordingly, the height of the axis A above the underside of the system body 2 can be reduced. Thus, the distance between the outer surface of the display unit 3 in a closed state and the underside of the system body 2, that is, the overall thickness of the computer, can be made smaller than in the conventional case shown in FIG. 49. Further, since the length of extension added to the depth of the system body 2 is about half the depth of the battery pack 4 (which is equal to the diameter of each battery plus something), it can be shorter than an extension length (L2) shown in FIG. 50.

Part of the proximal end portion 224 (mounting portion) of the display unit 3 is formed with a depression in order to avoid interfering with the front portion (except the groove) of the battery pack 4 when the display unit 3 is rotated. Symbol C designates a lead wire carrying ribbon which extends through the overhangs 213. The body of the computer in the system body 2 and the display in the display unit 3 are connected electrically to each other by means of the hinge unit 5.

Figure 4:
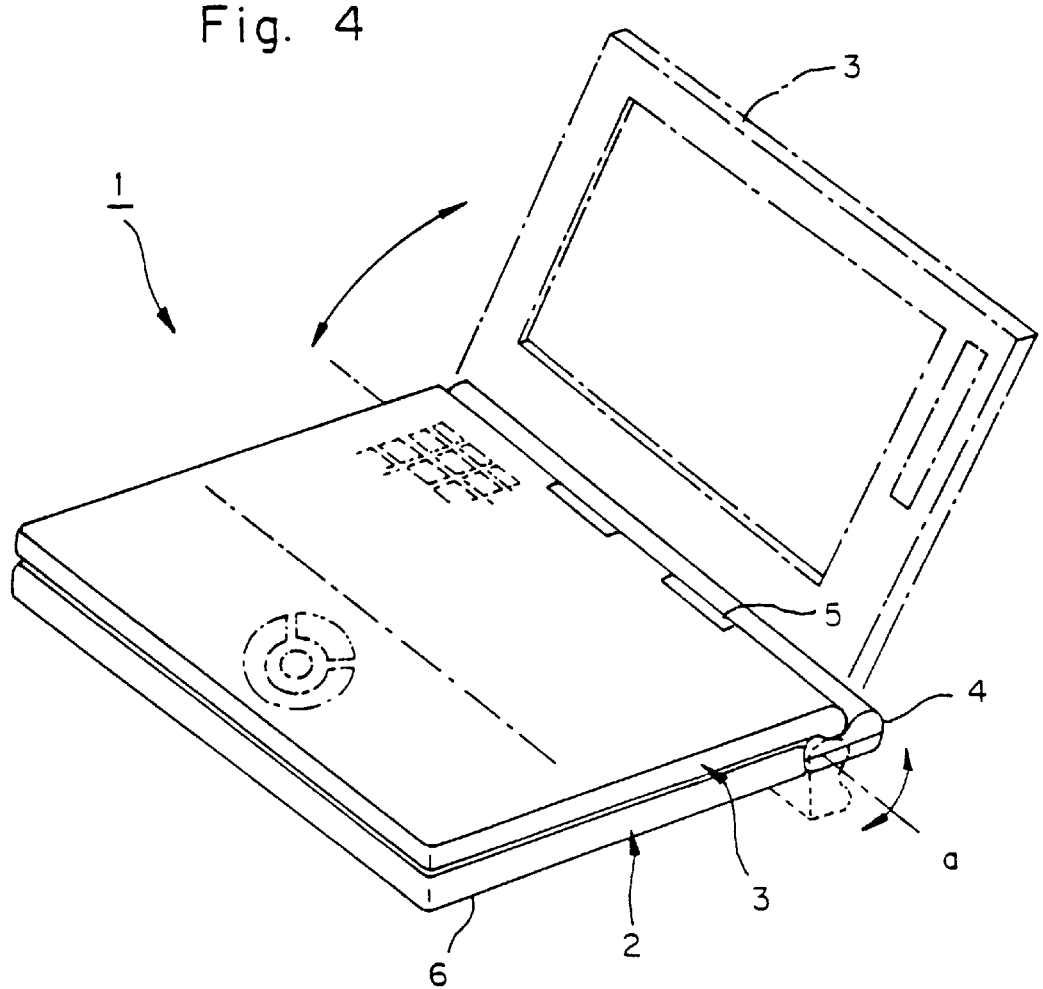
FIG. 4 is a perspective view of a portable computer according to a second embodiment of the invention.

Even in the case where the batteries used are arranged in three rows or more, the computer can be reduced in thickness in the same manner as in the case of FIG. 4 if a groove is formed on that portion of the battery pack which corresponds to the region between first and second rows or between second and third rows such that the hinge unit, which pivotally supports the cover member, is located corresponding to the groove.

A power jack receptacle 214, signal line connector receptacle 215, external equipment connecting terminals 216 and 217, infrared transmitter-receiver 218 for optical signal transfer, etc. are arranged on a side face of the system body 2 in the order named from the front side of the computer 1.

Referring now to FIGS. 4 to 48B, a second embodiment of the present invention and modifications thereof will be described.

FIG. 4 shows an outline of a portable computer 1, which is generally composed of a system body 2, a display unit 3, and a battery pack 4. The display unit 3 is swingably mounted on the system body 2 by means of a hinge unit 5 which is attached to the rear portion of the body 2 so as to be slightly raised. In FIG. 4, dashed lines indicates the display unit 3 in an open or standby state.

The system body 2 comprises a body casing 6 in which a circuit board and other functional components are installed. The battery pack 4 is attached to the rear portion of the system body 2 for rotation around a pack rotation axis "a" (mentioned later) between a horizontal position indicated by full line in FIG. 4 and a vertical position indicated by broken line. As shown in FIGS. 8A, 8B and 8C, the battery pack 4 includes a plastic pack casing 7 which is composed of upper and lower cases 7a and 7b joined integrally with each other, and contains six batteries 8 therein. The battery pack 4 is substantially as long as the rear edge of the system body 2, and extends long along the rear edge. Numeral 9 denotes rubber feet which are mounted on either side of the rear face of the pack casing 7. The batteries 8, which are of the rechargeable type, are integral with the pack casing and cannot be replaced with new ones, in some cases.

When the battery pack 4 is in the horizontal position, as shown in FIG. 4, its underside is substantially flush with that of the system body 2. When in the vertical position, the rear face of the battery pack 4 projects below the underside of the system body 2. When the portable computer 1 is placed on a desk in this state, therefore, the system body 2 is slightly inclined toward a user. Also, the rubber feet 9 attached to the rear face of the pack casing 7 are brought into contact with the top of the desk, and serve as nonskid means which can also absorb vibrational noises produced by key touching. The user can freely shift the position of the battery pack 4 between the horizontal position and the vertical position indicated by broken line.

Figure 5:
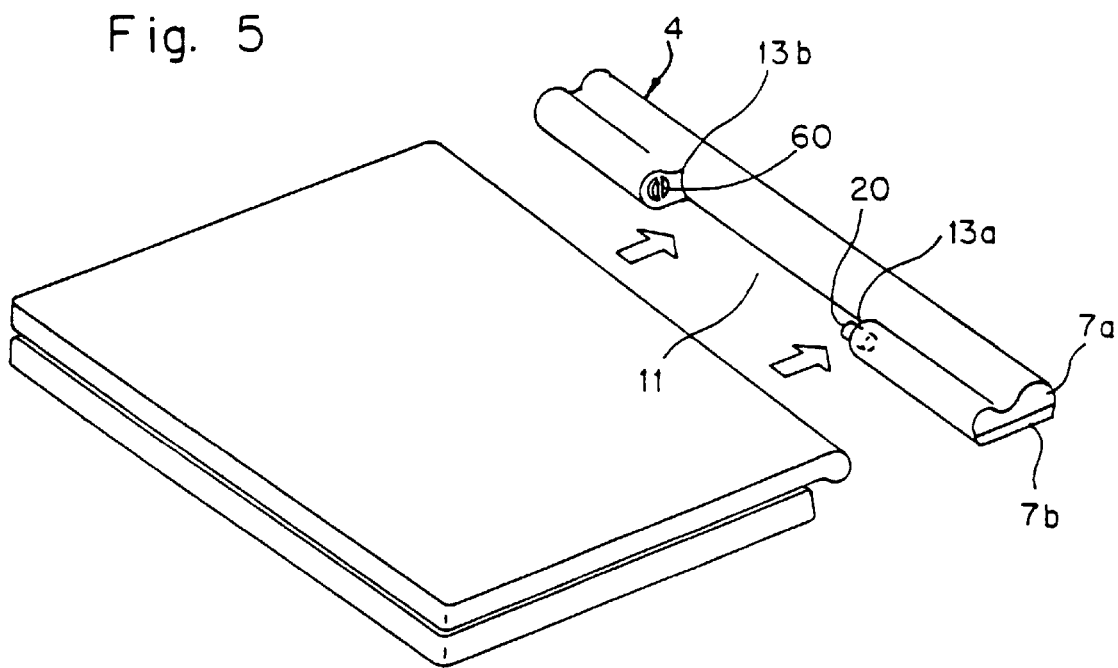
FIG. 5 is a perspective view showing a battery pack removed from the computer of FIG. 4.
Figure 6:
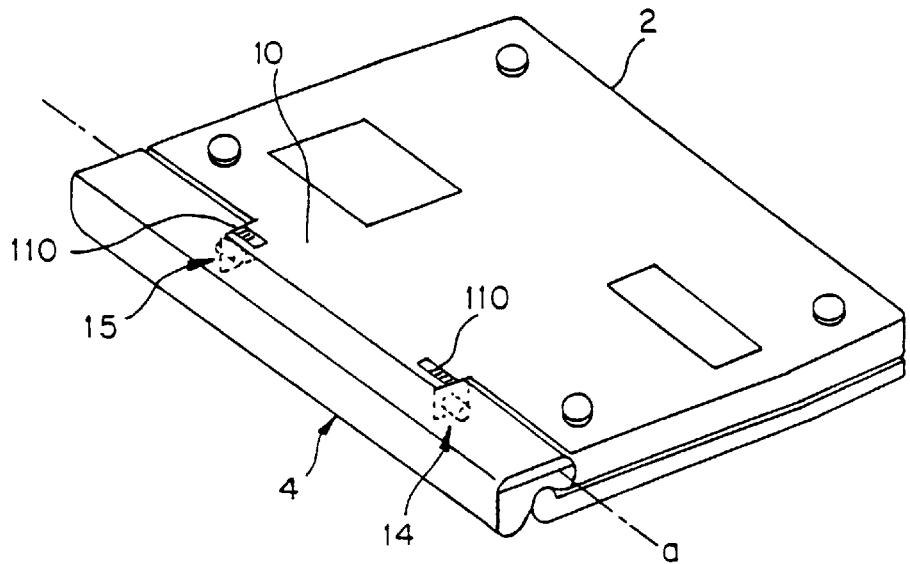
FIG. 6 is a perspective view showing the computer of FIG. 4 placed upside down.
Figure 7:
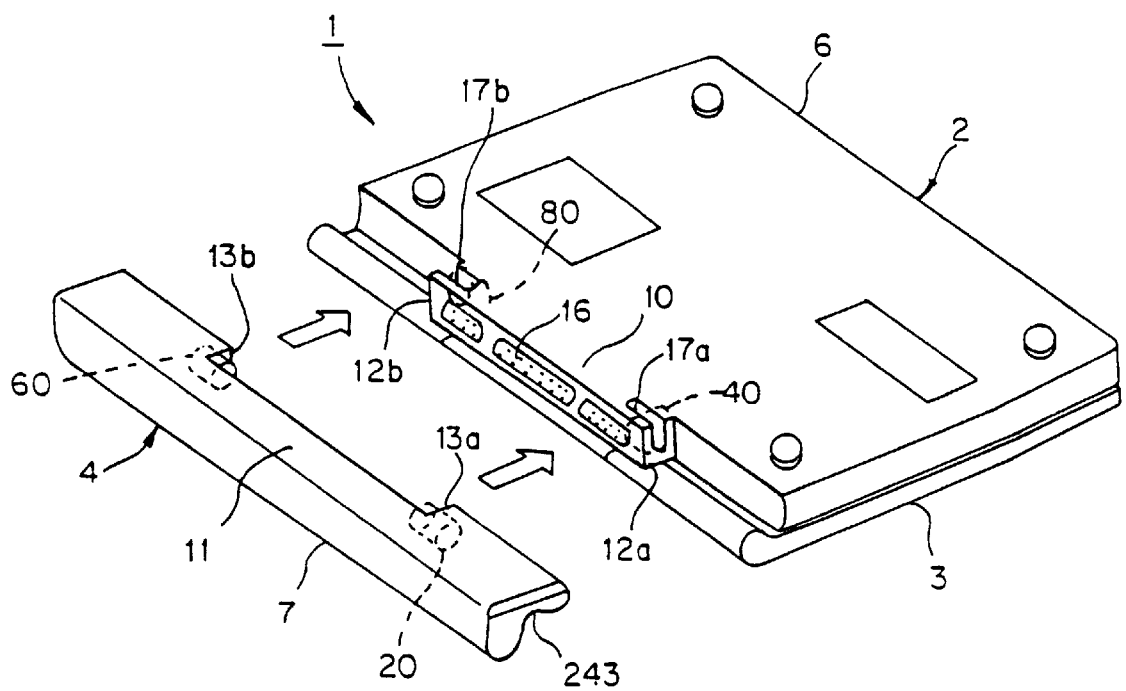
FIG. 7 is a perspective view showing the battery pack removed from the computer of FIG. 6.
Figure 9:
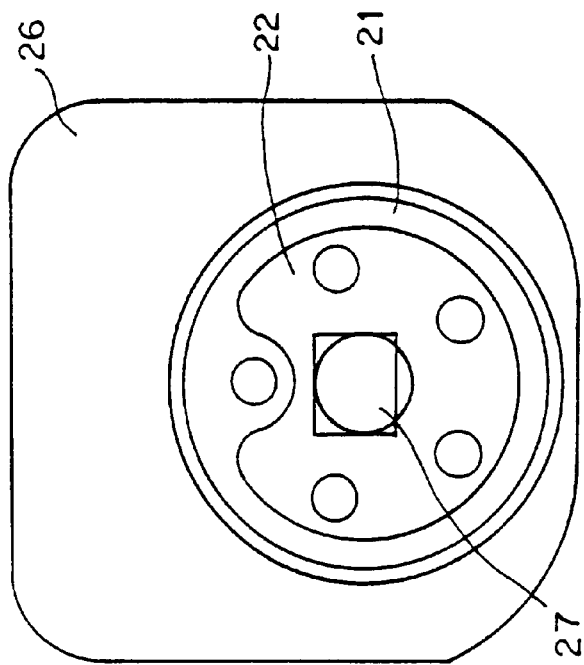
FIG. 9 is a side view of a rotating electrode attached to the battery pack shown in FIG. 7.

According to this embodiment, the system body 2 has a lug 10 which protrudes rearward from the central portion of its rear edge, as shown in FIG. 6. As shown in FIGS. 5 and 7, on the other hand, the battery pack 4 has a recess in the central portion of its front face with respect to its longitudinal direction, and is U-shaped as a whole. The battery pack 4 can be attached to or detached from the system body 2 by engaging with or disengaging the lug 10 of the body 2 and the recess 11 of the pack 4 from each other.

In FIG. 7, numeral 16 denotes a jack, which is used to connect the portable computer 1 and another apparatus such as a printer.

As shown in FIG. 6, the lug 10 of the system body 2 and the recess 11 of the battery pack 4 are connected to each other by means of first and second hinge structures 14 and 15 which are arranged in like manner between lug-side end faces 12a and 12b and recess-side end faces 13a and 13b which are opposed to one another on either side of the engagement portion when the lug 10 and the recess 11 are in engagement with each other. Both these hinge structures 14 and 15 are rotatable around the pack rotation axis "a", and can be removably attached to the lug 10 and the recess 11.

In this embodiment, as shown in FIGS. 5, 8A, 8B and 8C, the first hinge structure 14 is composed of a rotating electrode 20, which is located on the side of the recess 11 in alignment with the pack rotation axis "a", and a rotating connector 40, which is located on the side of the lug 10 and detachably fits the electrode 20 thereinto for rotation. The second hinge structure 15 is composed of a hinge pivot 60, which is located on the side of the recess 11 in alignment with the pack rotation axis "a", and a hinge 80, which is located on the side of the lug 10 and detachably fits the pivot 60 thereinto for rotation.

[Supporting Structure for Display Unit 3]

Figure 45:
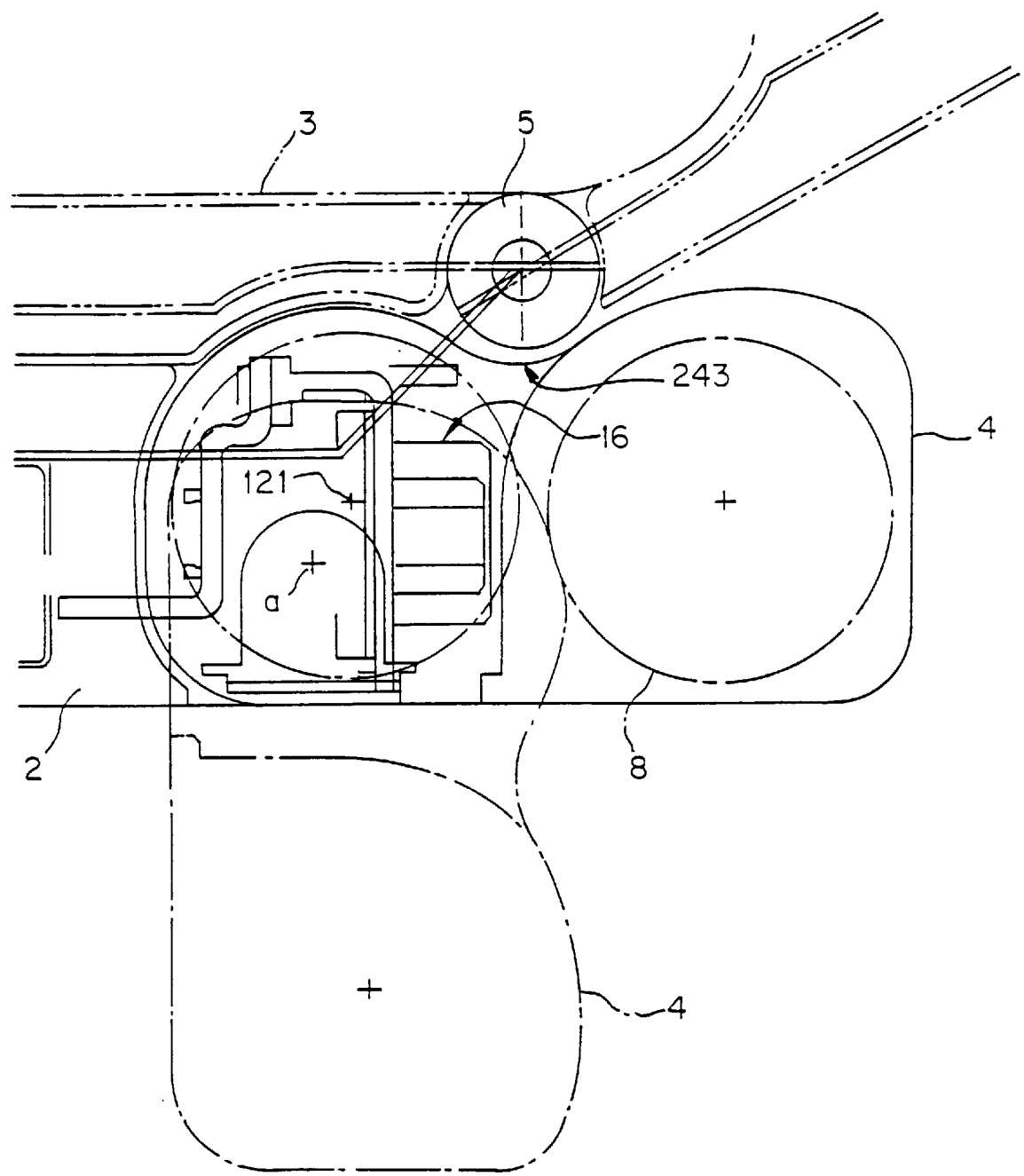
FIG. 45 is a view for illustrating the manner in which the battery pack of FIG. 4 rotates.

As shown in the plan view of FIG. 8B, the battery pack 4 contains the six batteries in two rows (four in a first row and two in a second row). As shown in FIG. 45, a groove 243 is formed in that portion of the battery pack 4 which corresponds to the region between the rows. On the other hand, the display unit 3 (i.e., cover member with liquid crystal) is swingably supported on the system body 2 by means of the hinge unit 5 which is attached to the rear portion of the body 2 so as to be slightly raised. The hinge unit 5, like the one according to the first embodiment described with reference to FIG. 2, is partially fitted in the groove 243 of the battery pack 4. Thus, the whole computer 1, like the one according to the first embodiment, has a thin profile.

[Construction and Assembly of Rotating Electrode 20]

The rotating electrode 20 (FIGS. 9 and 10) is integrally formed of a plurality of cores 22 each having an electrode 21 and stacked in layers, a collar 23, rotating support portion 24, bearing portion 25, flange-shaped fixing portion 26, and core fixing shaft 27 which axially penetrates the center of the structure. The central axis of the rotating electrode 20 is in line with the rotation axis "a" of the pack.

Figure 12A:
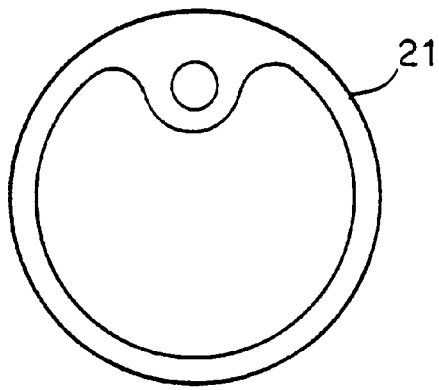
FIGS. 12A and 12B are a side view and a front view (partially in section), respectively, of an electrode which constitutes the rotating electrode of FIG. 10.
Figure 12B:
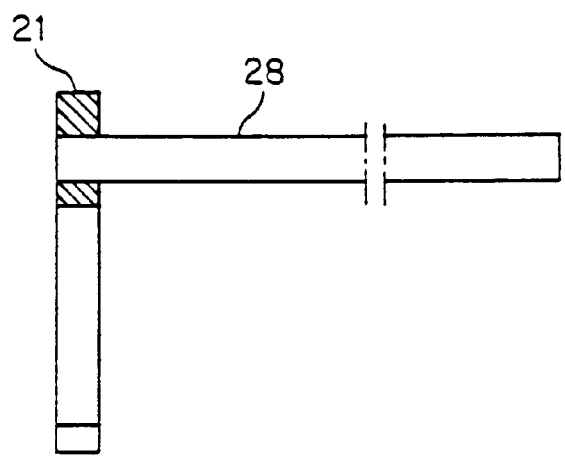

As shown in FIGS. 12A and 12B, each electrode 21 is in the form of a ring, whose circular plane is penetrated perpendicularly by a conductor 28. The conductor 28 is a pin having a circular cross section, and its one end is fixed to an inwardly bulging portion of the ring by soldering or press fitting. The length of the conductor 28, which varies depending on the position of the electrode 21, is a size such that the conductor penetrates the fixing portion 26 to be exposed behind it, as shown in FIG. 10.

Figure 11A:
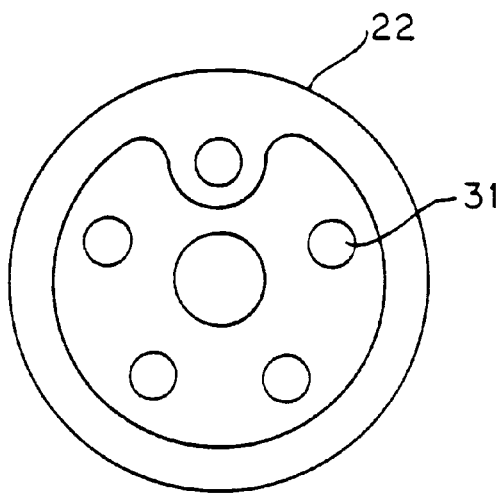
FIGS. 11A and 11B are a side view and a front view, respectively, of a core of the battery pack.
Figure 11B:
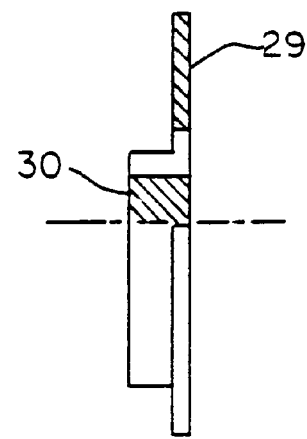

As shown in FIGS. 11A and 11B, each core 22 is a disk-shaped injection-molded product of an insulating synthetic resin, which is composed of a peripheral partition wall portion 29 and a thick-walled central support portion 30 having a stepped peripheral edge. The support portion 30 is formed with conductor guide holes 31. The number of the guide holes 31 is made to be equal to that of the stacked electrodes 21 or greater than a practically necessary number so that the cores 22 enjoy general-purpose properties.

Each adjoining electrode 21 is fitted integrally on the stepped peripheral edge of the support portion 30 of each core 22.

Figure 10:
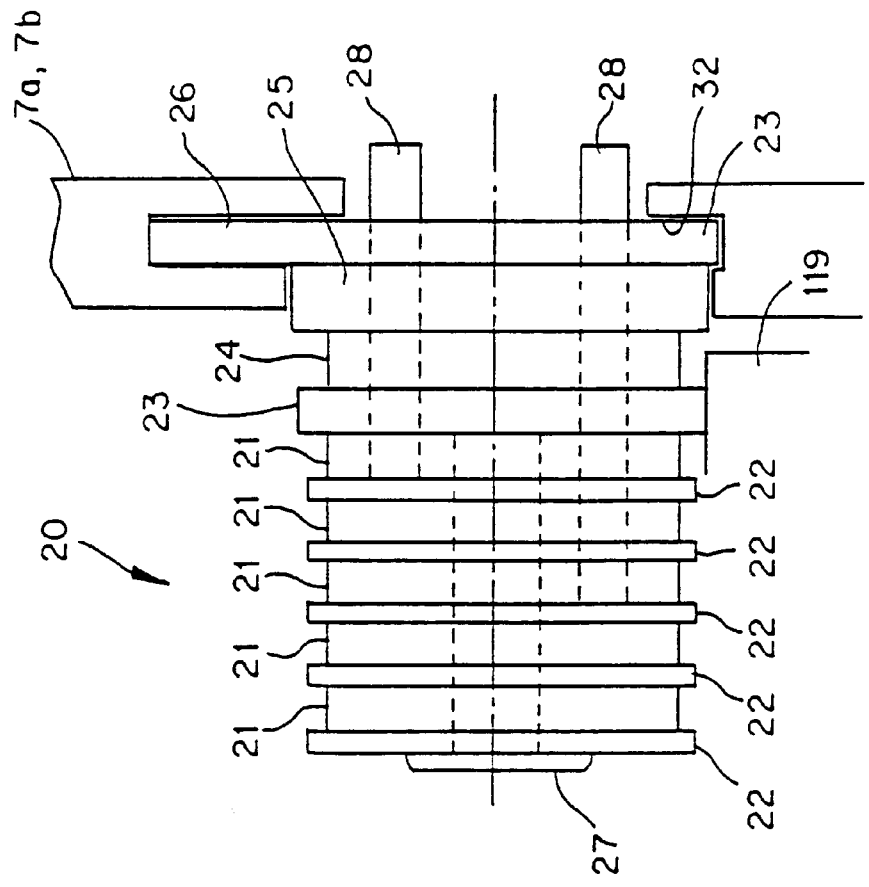
FIG. 10 is a front view, partially in section, showing the rotating electrode of FIG. 9.

As shown in FIG. 10, the core fixing shaft 27, collar 23, rotating support portion 24, bearing portion 25, and flange-shaped fixing portion 26 are synthetic resin products formed integrally and coaxially with one another in the order named. The conductor guide holes 31, are formed around the core fixing shaft 27 at the distal end as many as the cores 22 with the same arrangement as the cores 22.

Five cores 22, each fitted with the electrode 21, are stacked in layers in a manner such that the conductor 28 is passed through the conductor guide holes 31 in different positions. The resulting structure is fitted onto the core fixing shaft 27 from the distal side thereof, and the distal end of the shaft 27 is fixed by heat caulking or the like lest the cores 22 be movable. Thereupon, the rotating electrode 20 is completed. In the completed rotating electrode 20, a cylindrical surface formed by the electrodes 21 is flush with the cylindrical surface of the rotating support portion 24, constituting a rotating shaft of the first hinge structure 14.

Alternatively, the collar 23, rotating support portion 24, bearing portion 25, and flange-shaped fixing portion 26 may be individual parts and these parts may be stacked together with the cores 22 so that they are united by means of a screw-nut mechanism or the like, in place of the core fixing shaft 27.

[Attachment of Rotating Electrode 20]

Figure 13:
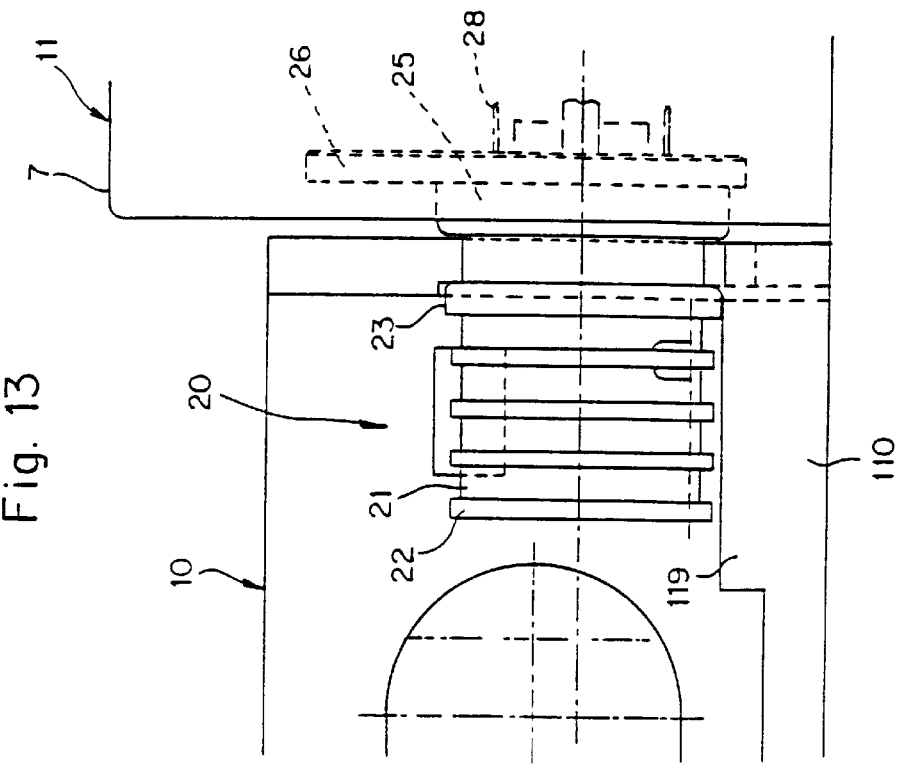
FIG. 13 is a view showing the rotating electrode of FIG. 10 attached to the battery pack of FIG. 7.

As shown in FIGS. 10 and 13, the rotating electrode 20 is fixed in a manner such that the flange-shaped fixing portion 26 is inserted into a groove 32 (FIG. 10) in the upper and lower cases 7a and 7b of the pack casing 7 and bonded thereto by means of an adhesive agent. At this time, the bearing portion 25 of the rotating electrode 20 is supported in contact with a semicircular edge portion of the groove 32, and each electrode 21 is positioned with respect to the end face 12a of the lug 10 of the system body 2. The conductor 28 of the rotating electrode 20 is connected to a power circuit in the pack casing 7.

[Construction and Assembly of Rotating Connector 40]

Figure 16:
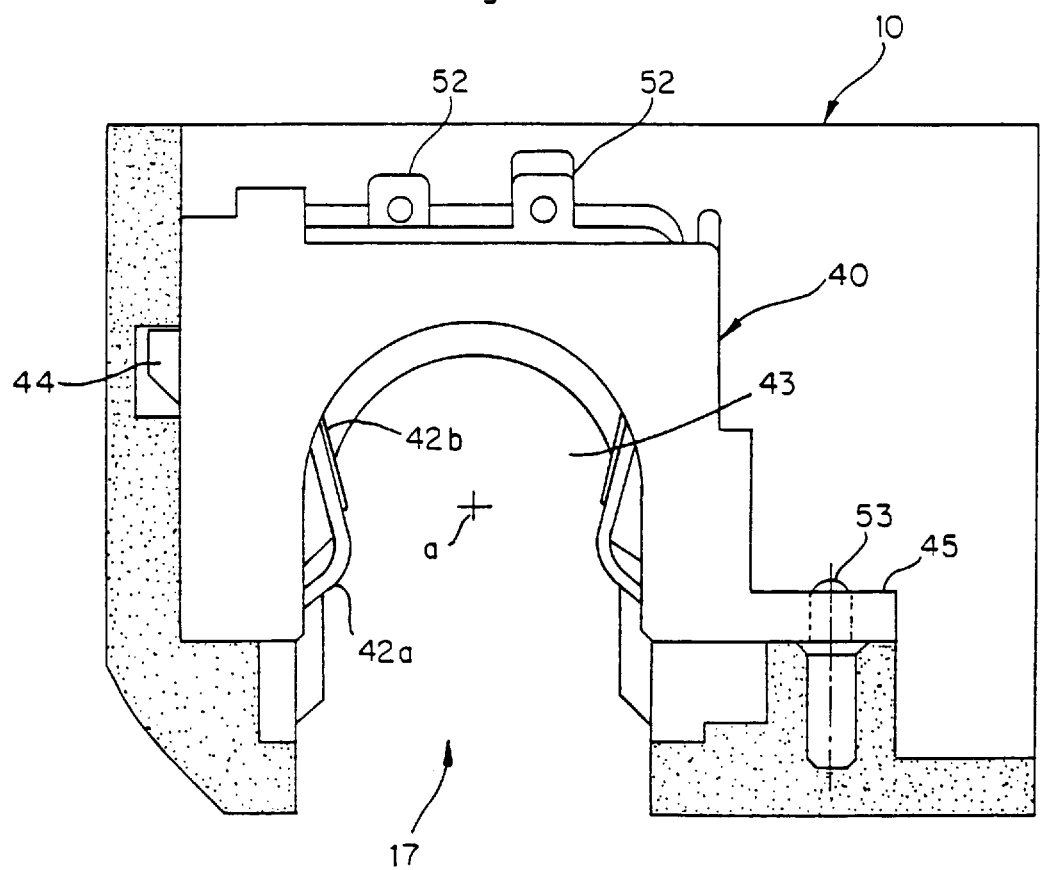
FIG. 16 is one side view of the rotating connector of FIG. 15.

As shown in FIG. 16, the rotating connector 40 (FIG. 7) is fixedly attached to the bottom of a recessed fitting portion 17a which is formed in the recess-side end portion of the lug 10 of the system body 2 by cutting the end face 12a upward from the underside to a position such that the pack rotation axis "a" is inside the fitting portion 17a.

The rotating connector 40 is composed of a connector frame 41 and U-shaped electrodes 42a and 42b.

Figure 15:
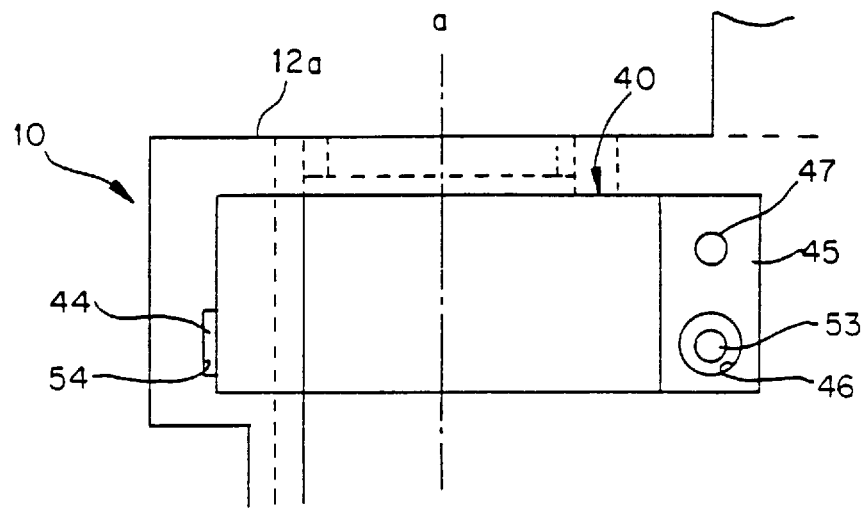
FIG. 15 is an enlarged view of a rotating connector shown in FIG. 7.
Figure 17:
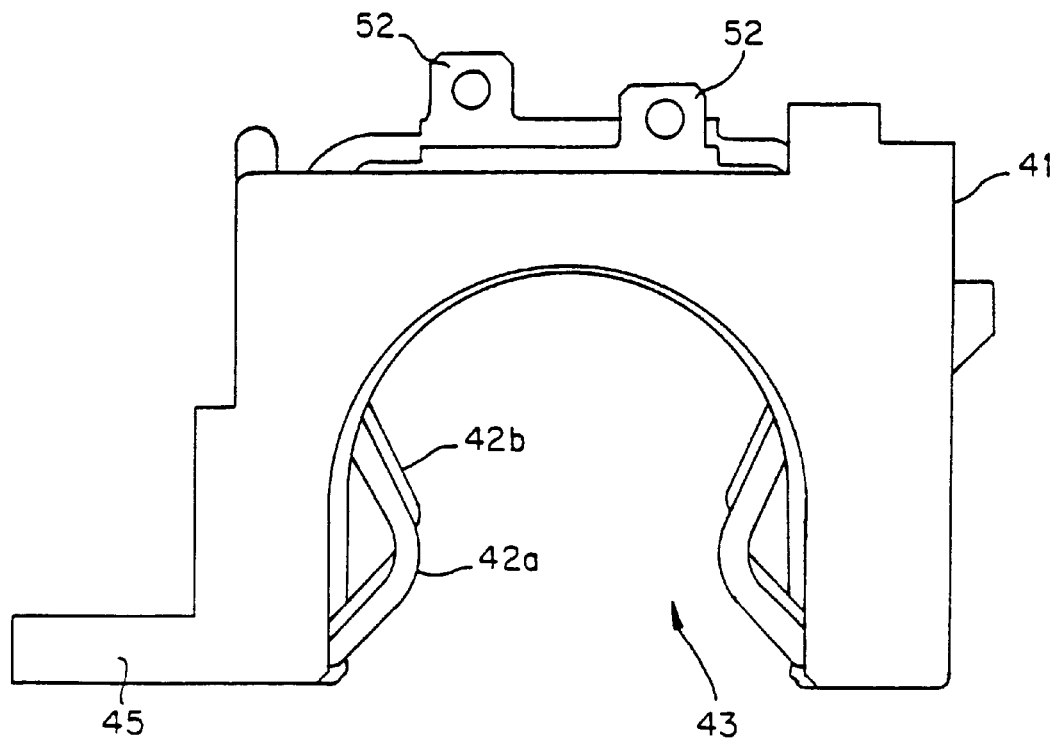
FIG. 17 is the other side view of the rotating connector of FIG. 15.
Figure 18:
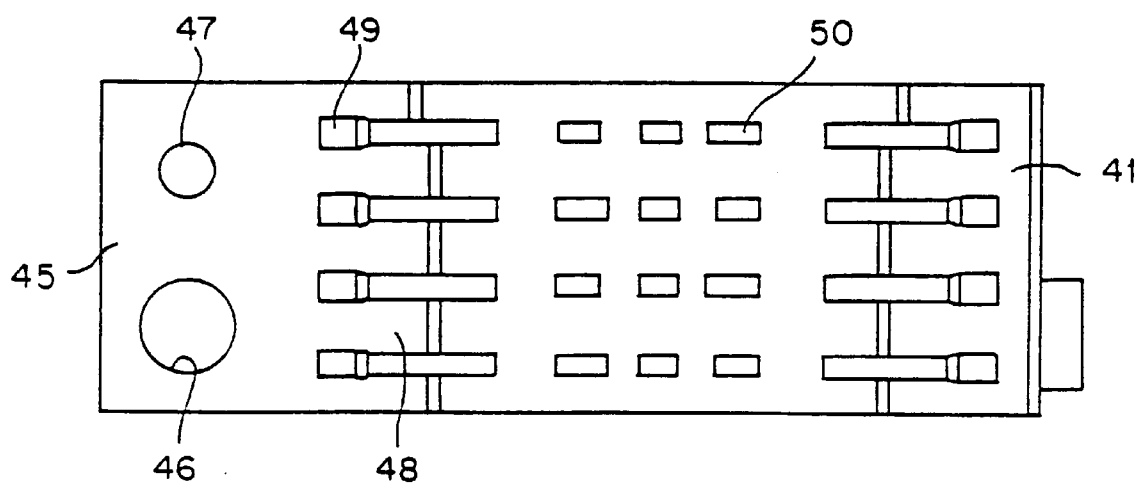
FIG. 18 is a bottom view of the rotating connector of FIG. 17.

As shown in FIGS. 17 and 18, the connector frame 41 is a box-shaped injection-molded product of an insulating synthetic resin. If the side on which rotating electrode 20 is received is the underside, the frame 41 has a top face opposite to the underside, front and rear faces, and lateral faces. A U-shaped groove 43 is formed extending from the underside toward the top face and penetrating the lateral faces. A hook 44 is attached to the front face of the frame 41, while a post portion 48 protrudes horizontally from the rear face. The bottom portion of the U-shaped groove 43 is semicircular, its center is in alignment with the rotation axis "a", and its diameter is substantially equal to the diameter of the rotating support portion 24 for the electrodes 21 of the rotating electrode 20. As shown in FIG. 15, the post portion 45 is formed with a post hole 46 and a tapped hole 47.

The underside of the connector frame 41 is open, and guide slots 49 are defined inside by U-shaped partition walls 48 which extend along the front and rear faces of the frame 41. The guide slots 49 are as many as the electrodes 21 of the rotating electrode 20 or the U-shaped electrodes 42a and 42b. Positioning holes 50 or the electrodes 42a and 42b are formed in alignment with one another in the top face of the connector frame 41.

The U-shaped electrodes 42a and 42b have spring elasticity, and an inward positioning protrusion 51 and an outward reed piece 52 are formed on the base portion of the U-shaped structure of each U-shaped electrode. The electrodes 42a and 42b (FIGS. 21 and 22) are different from each other in the positions of the protrusion 51 and the piece 52. The electrodes 42a and 42b are also different from each other in the length of their contact portions which extend on either side. The contact portions of the electrodes 42b are shorter by a margin "d" than those of the electrodes 42a, and the marginal portions are used for signal lines.

Figure 21:
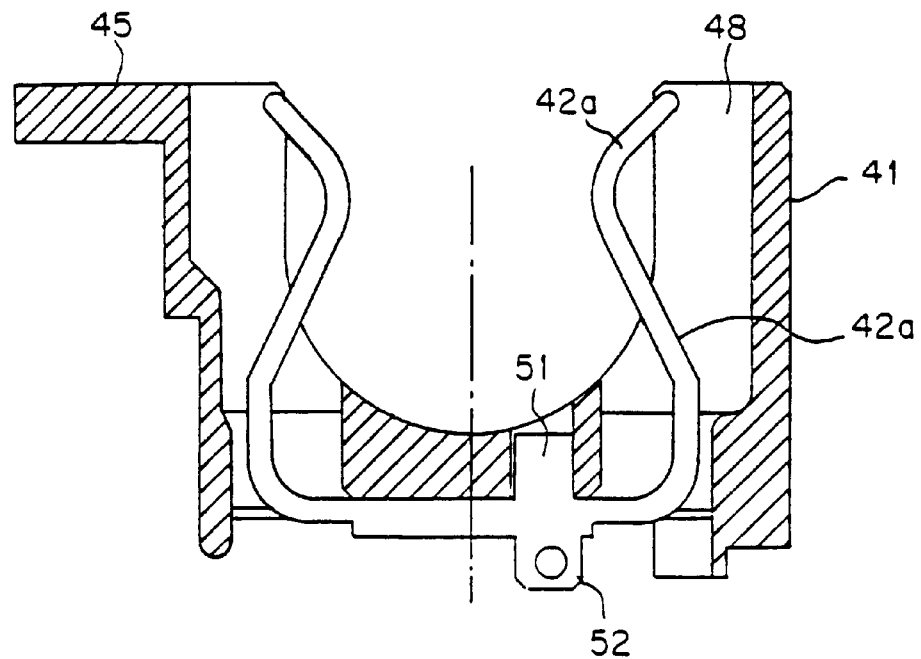
FIGS. 21 and 22 are sectional views of the rotating connector of FIG. 19.
Figure 22:
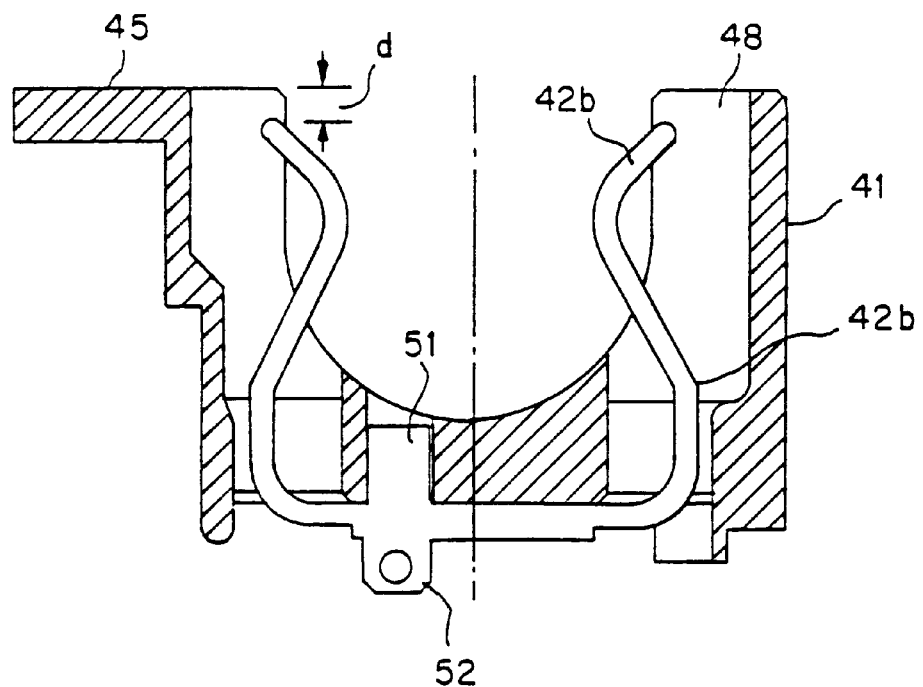

As shown in FIGS. 21 and 22, the U-shaped electrodes 42a and 42b are mounted in the connector frame 41 with their respective contact portions located in the corresponding guide slots 49 and with their base positioning protrusions 51 fitted in the corresponding positioning holes 50. Although the U-shaped electrodes 42a and 42b are four in total number in FIGS. 18 and 20, they should be five when expected to correspond to the rotating electrode 20. The U-shaped electrodes 42a and 42b may be mounted in the connector frame 41 in any desired manner, provided that they cannot be disengaged from the frame 41 and are isolated from one another and that their contact portions can move back and forth in some measure.

In this embodiment, the U-shaped electrodes 42a are used individually as positive and negative terminals for the power supply, and are arranged on either side of the set of U-shaped electrodes 42b. With this arrangement, when the rotating electrode 20 is set in the rotating connector 40, the U-shaped electrodes 42a for the power supply are first connected to the rotating electrode 20, and then the electrodes 42b for signals are connected. Thus, there is no possibility of sparking between the electrodes (between jacks and plugs). The battery pack 4 contains a circuit in which no electric current flows until the rotating electrode 20 comes into contact with all the U-shaped electrodes 42a and 42b.

[Attachment Structure for Rotating Connector 40]

Figure 14:
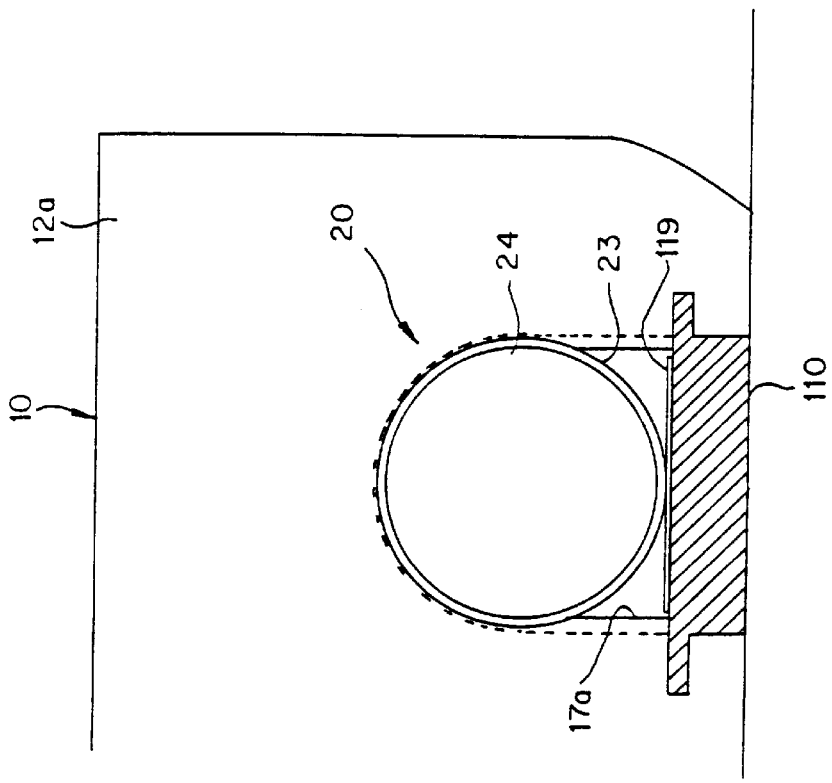
FIG. 14 is a view showing the positional relationship between a collar of the rotating electrode of FIG. 10 and a sliding door.

The lug 10 of the system body 2 is formed with a post 53 (FIG. 16) and a hook recess 54 (FIG. 15). The post 53 is fitted into the post hole 46 of the connector frame 41, and the hook 44 of the frame 41 is clicked into the hook recess 54 so that the frame 41 is mounted in position. Thereafter, the connector frame 41 is fixed by means of a screw which is screwed into the tapped hole 47. The position of the post 53 is at a predetermined distance from the end face 12a of the lug 10. Thus, the rotating electrode 20, arranged with respect to the end face 12a, is can be positioned accurately corresponding to the position of the respective electrodes of the rotating connector 40. The rotating connector 40 serves as a bearing for the rotating electrode 20 which serves as the rotating shaft (FIG. 14). Thus, the connector 40 and the electrode 20 constitute the first hinge structure 14 which is detachable and rotatable.

[Construction of Hinge Pivot 60]

Figure 23A:
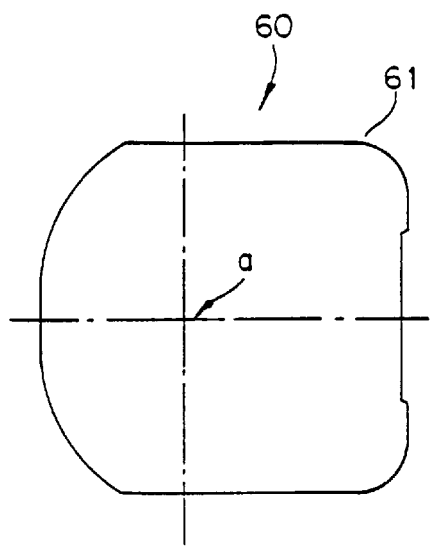
FIGS. 23A and 23B are a rear side view and a front view, respectively, of a hinge pivot shown in FIG. 7.
Figure 23B:
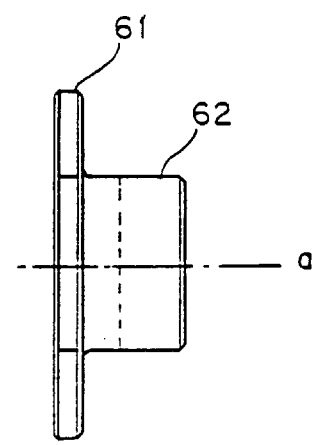
Figure 24A:
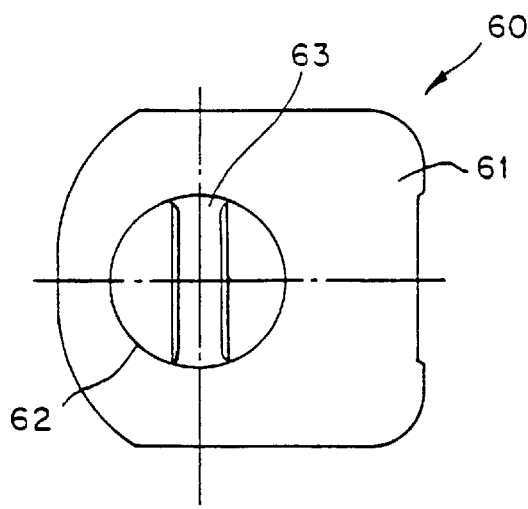
FIGS. 24A and 24B are a front side view and a plan view, respectively, of the hinge pivot shown in FIG. 7.
Figure 24B:
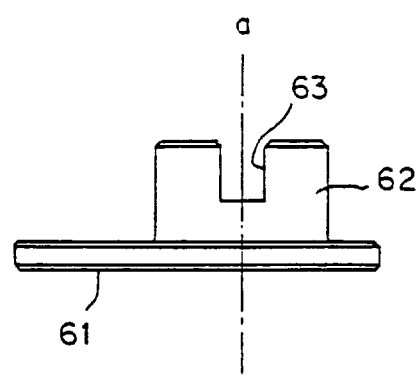
Figures 25A, 25B:
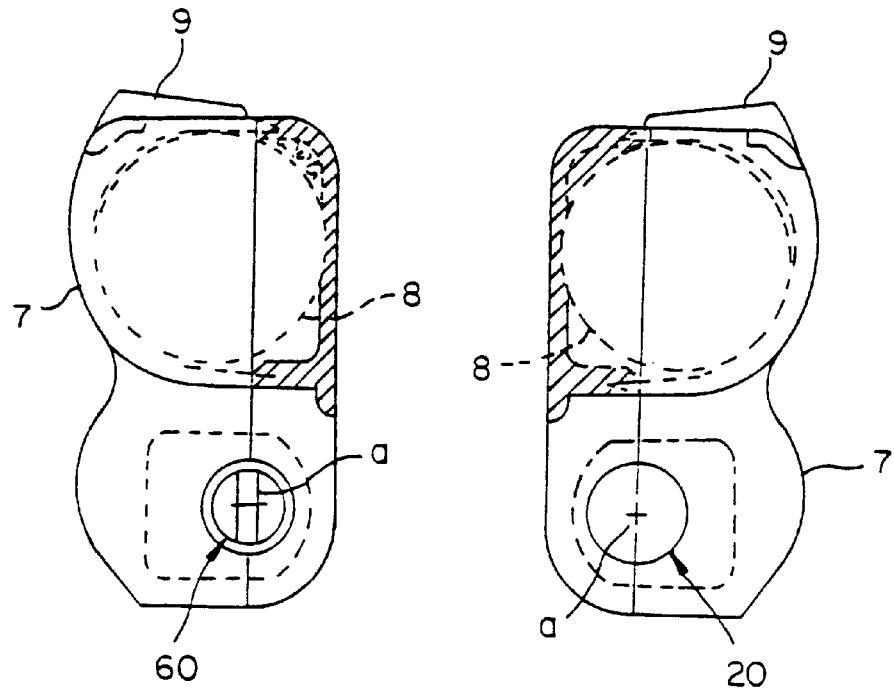
FIGS. 25A and 25B are one side view (hinge pivot side) and the other side view (rotating electrode side), respectively, of a recess of the battery pack of FIG. 7.
Figure 26:
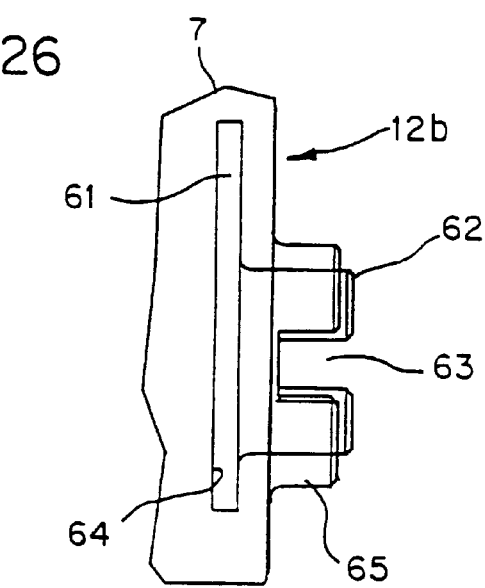
FIG. 26 is a view showing the hinge pivot of FIGS. 23A to 24B attached to the battery pack.

The hinge pivot 60 (FIG. 7), which is an integral metallic product, is composed of a flange-shaped joint fixing portion 61 and a joint portion 62, as shown in FIGS. 23A and 23B. As shown in FIG. 24, a diametrical joint groove 63 is formed in the end face of the joint portion 62. The axis of the joint portion 62 is in line with the pack rotation axis "a".

[Attachment Structure for Hinge Pivot 60]

In this embodiment, as shown in FIG. 7, the hinge pivot 60 is attached to the end face 13b of the recess 11 so that its axis is in line with the pack rotation axis "a". More specifically, the flange-shaped fixing portion 61 is inserted into a groove 64 (FIGS. 26 and 31) in the upper and lower cases 7a and 7b of the pack casing 7 and bonded thereto by means of an adhesive agent. A projecting rib 65 is formed on those portions of the cases 7a and 7b which constitute the end face 13b. The rib 65 serves to position the joint portion 62 of the hinge pivot 60 so that its axis is in line with the pack rotation axis "a". The hinge pivot 60 constitutes one shaft of the second hinge structure 15.

[Construction and Assembly of Hinge 80]

Figure 27A:
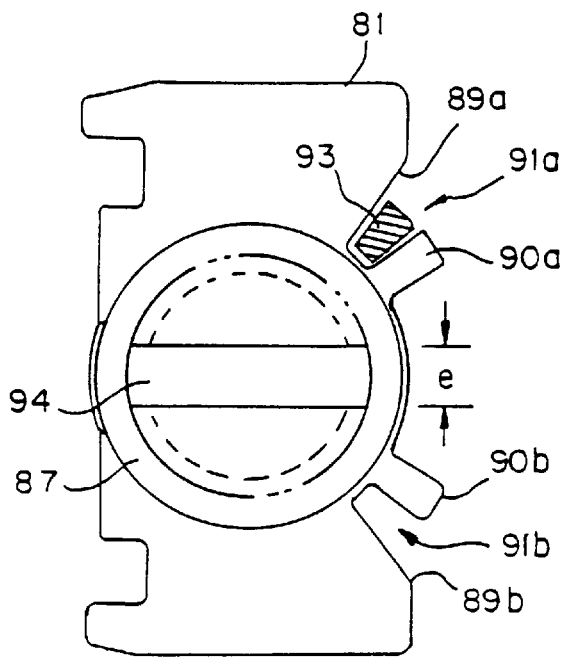
FIGS. 27A and 27B are a side view and a front view, respectively, of a hinge of FIG. 7 to be in engagement with the hinge pivot of FIGS. 23A to 24B.
Figure 27B:
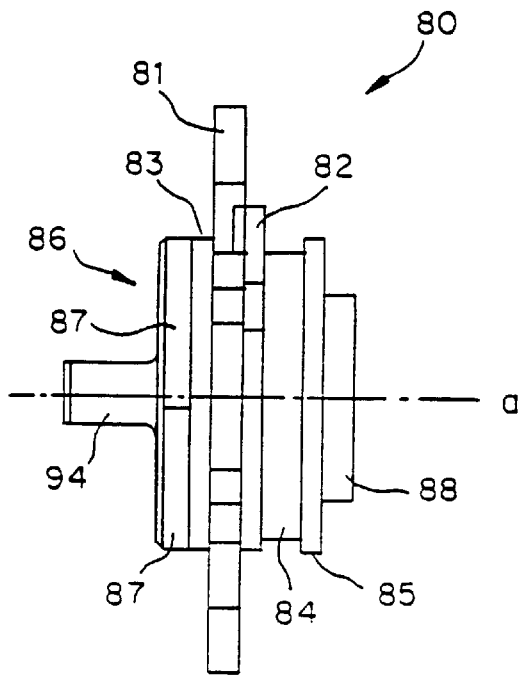
Figure 28:
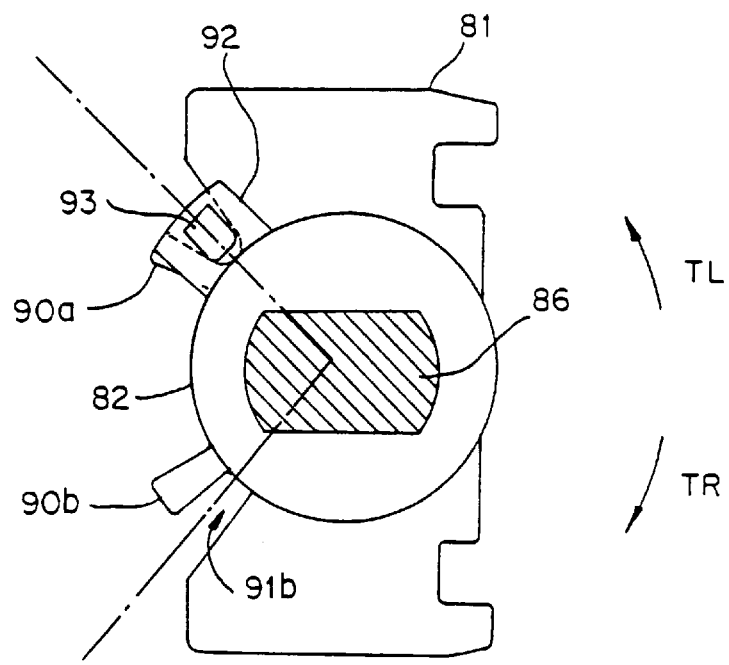
FIG. 28 is a view for illustrating an operating state of the hinge of FIGS. 27A and 27B.

As shown in FIGS. 27A, 27B and 28, the hinge 80 is a metallic member which is composed of a high-rigidity fixing plate 81, friction plates 82 and 83 having spring elasticity, spring 84, spring backup 85, and rotating portion 86. The rotating portion 86 is rotatably mounted on the fixing plate 81, and the friction plates 82 and 83 cannot rotate relatively to the rotating portion 86. The axis of the rotating portion 86 is in line with the pack rotation-axis "a".

The friction plates 82 and 83 and the spring 84 are sandwiched between the fixing plate 81 and front and rear flanges 87 and 88. The friction plates 82 and 83 are mounted pressurized by the spring 84 and the spring backup 85. Thus, frictional forces are produced between the fixing plate 81 and the friction plates 82 and 83, so that rotating the rotating portion 86 relatively to the fixing plate 81 requires a torque not lower than a predetermined level.

As shown in FIG. 27A, the fixing plate 81 has a U-shaped groove 91a, which is defined by an end portion 89a thereof and a protrusion 90a, and a U-shaped groove 91b, which is defined by a protrusion 90b and an end portion 89b in like manner. As shown in FIG. 28, on the other hand, a protrusion 92 of the friction plate 82 is provided with a projecting portion 93 which has substantially the same width as the U-shaped grooves 91a and 91b of the fixing plate 81.

The front flange 87 of the rotating portion 86 is formed with a joint protrusion 94 which extends in the diametrical direction thereof. The width "e" (FIG. 27A) of the protrusion 94 is substantially equal to the width of the joint groove 63 of the hinge pivot 60.

When the rotating portion 86 is turned from the U-shaped groove 91a of the fixing plate 81 toward the U-shaped groove 91b, the projecting portion 93 of the friction plate 82 runs onto the protrusion 90a of the plate 81. Thereupon, the protrusion 92 of the friction plate 82 having spring elasticity is elastically deformed, thereby producing a click effect. When the rotating portion 86 is further turned, the projecting portion 93 is disengaged from the protrusion 90a. A click is also produced at this time.

A click is also produced when the projecting portion 93, starting from the protrusion 90a, reaches and runs onto the protrusion 90b. A similar click is generated when the projecting portion 93 falls into the U-shaped groove 91b after clearing the protrusion 90b. When the projecting portion 93 falls into the U-shaped groove 91b, the position of the rotating portion 86 is stabilized so that the rotation is regulated, since the projecting portion 93 and the groove 91b are substantially equal in width. The maximum allowable angle of rotation of the projecting portion 93 is about 90°.

[Attachment Structure for Hinge 80]

Figure 31:
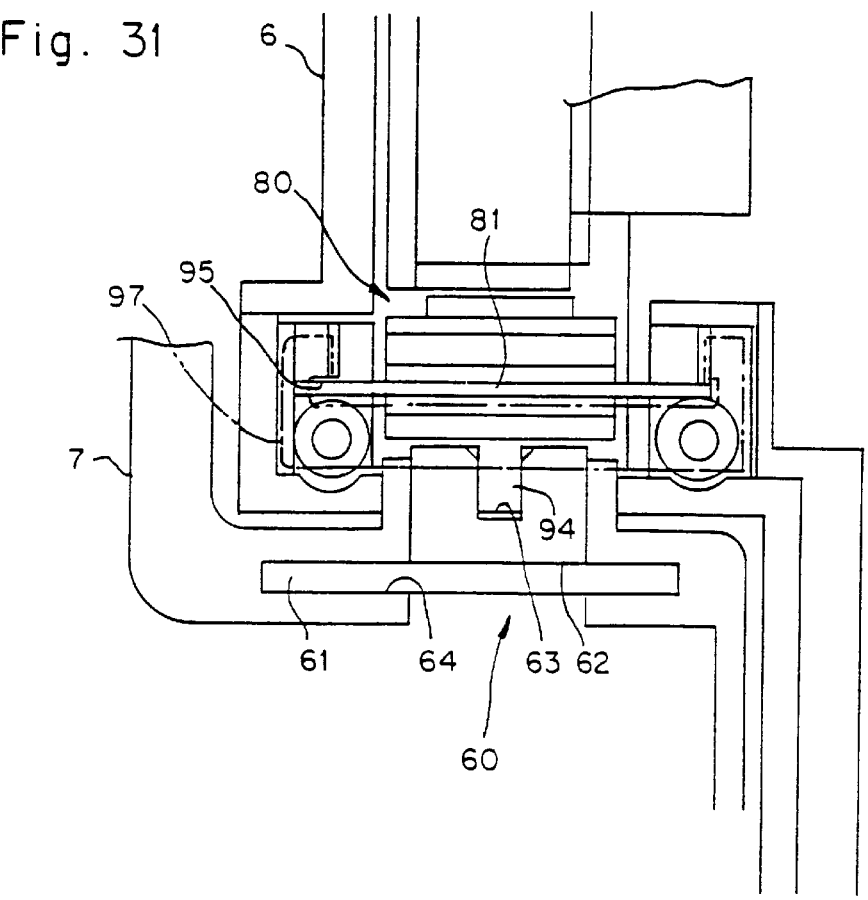
FIG. 31 is a view showing the hinge pivot of FIGS. 23A to 24B and the hinge of FIG. 27B in engagement with each other.
Figure 42:
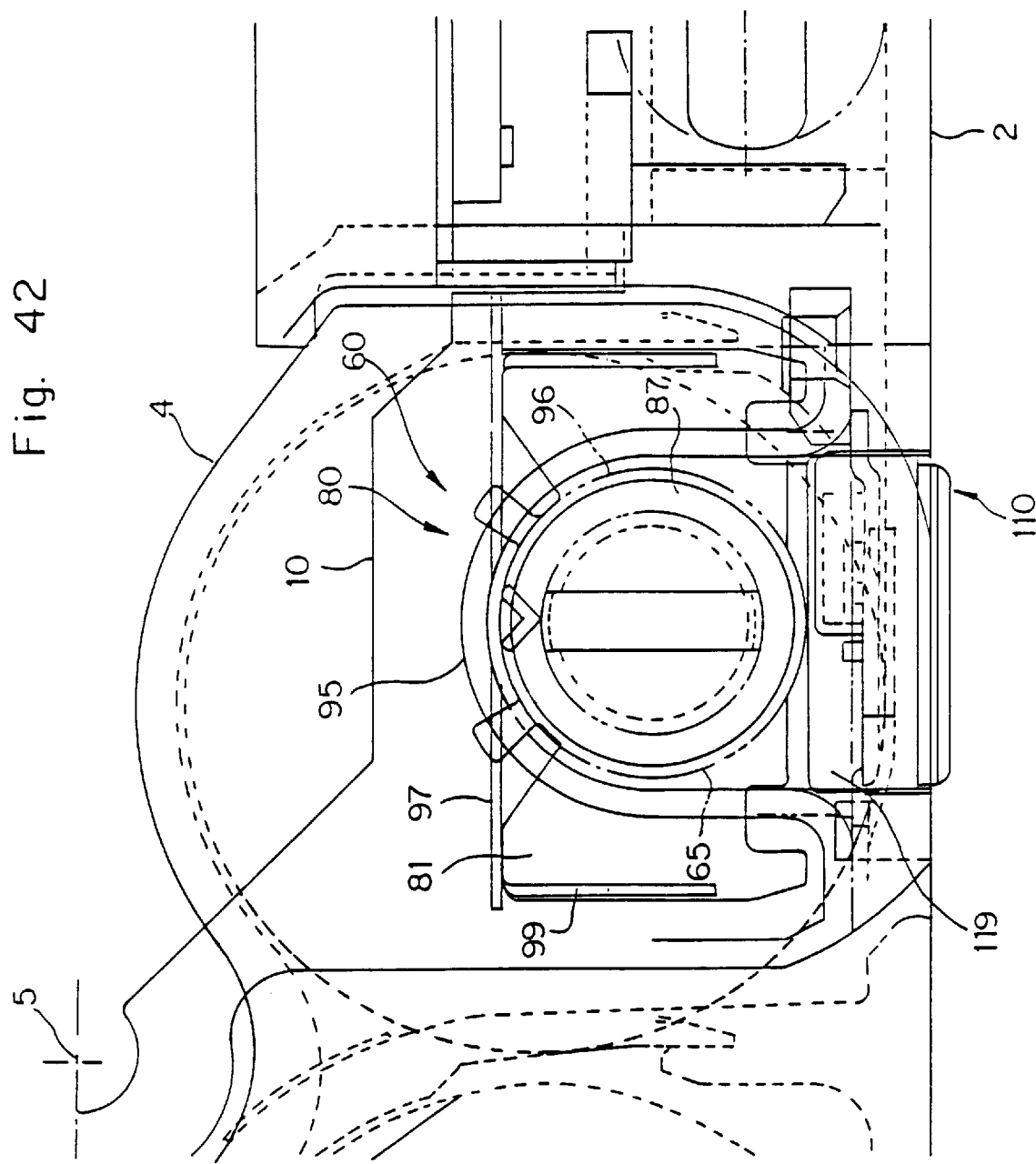
FIG. 42 is a side view showing the sliding door, hinge pivot, and hinge attached to the system body of the computer of FIG. 4.

In this embodiment, the hinge 80 is fixedly attached to the bottom of a recessed fitting portion 17b (FIG. 7) which is formed in the recess-side end portion of the lug 10 of the system body 2 by cutting the end face 12b upward from the underside to a position such that the pack rotation axis "a" is inside the fitting portion 17b. More specifically, as shown in FIG. 31, a groove 95 is formed in that portion of the end face 12b of the body casing 6 which constitutes the lug 10. The fixing plate 81 is fitted in the groove 95 so that the hinge 80 is positioned with respect to the transverse direction. As shown in FIG. 42, moreover, the peripheral surface of the front flange 87 of the hinge 80 is supported on a semicircular bearing surface 96 of the body casing 6 so that the axis of the hinge 80 is in line with the pack rotation axis "a".

Figure 32:
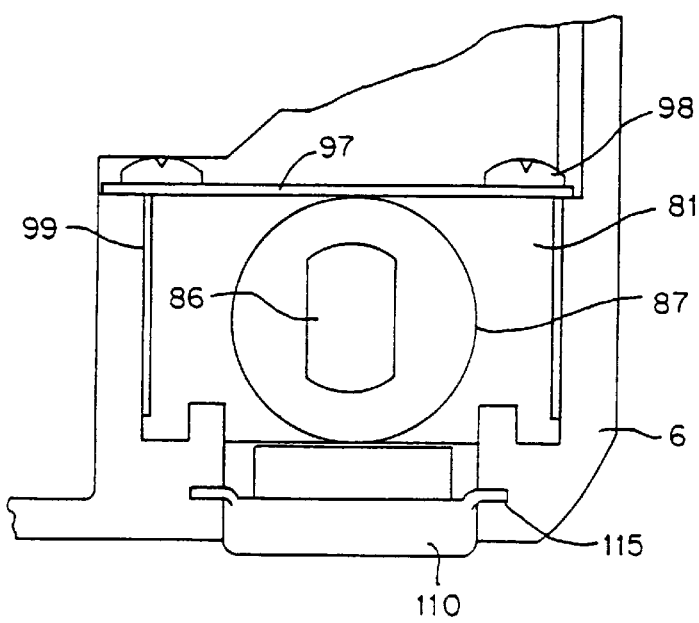
FIG. 32 is a view for illustrating the relative positions of the hinge of FIG. 27B to the sliding door of FIG. 14.

The hinge 80 thus set in the recessed fitting portion 17b is mounted in a manner such that it is first covered by a hinge backup 97 shown in FIGS. 29A, 29B and 30 in the manner shown in FIGS. 32 and 42, and the hinge backup 97 is then fixed to the body casing 6 by means of a screw 98. The hinge backup 97 is a substantially U-shaped stainless-steel member which has two legs 99.

As compared with the hinge pivot 60 which is equivalent to a fixed rotating shaft, the hinge 80 is equivalent to a rotatable bearing connected to the shaft. The hinge pivot 60 and the hinge 80 constitute the second hinge structure 15 (FIG. 6).

Figure 33:
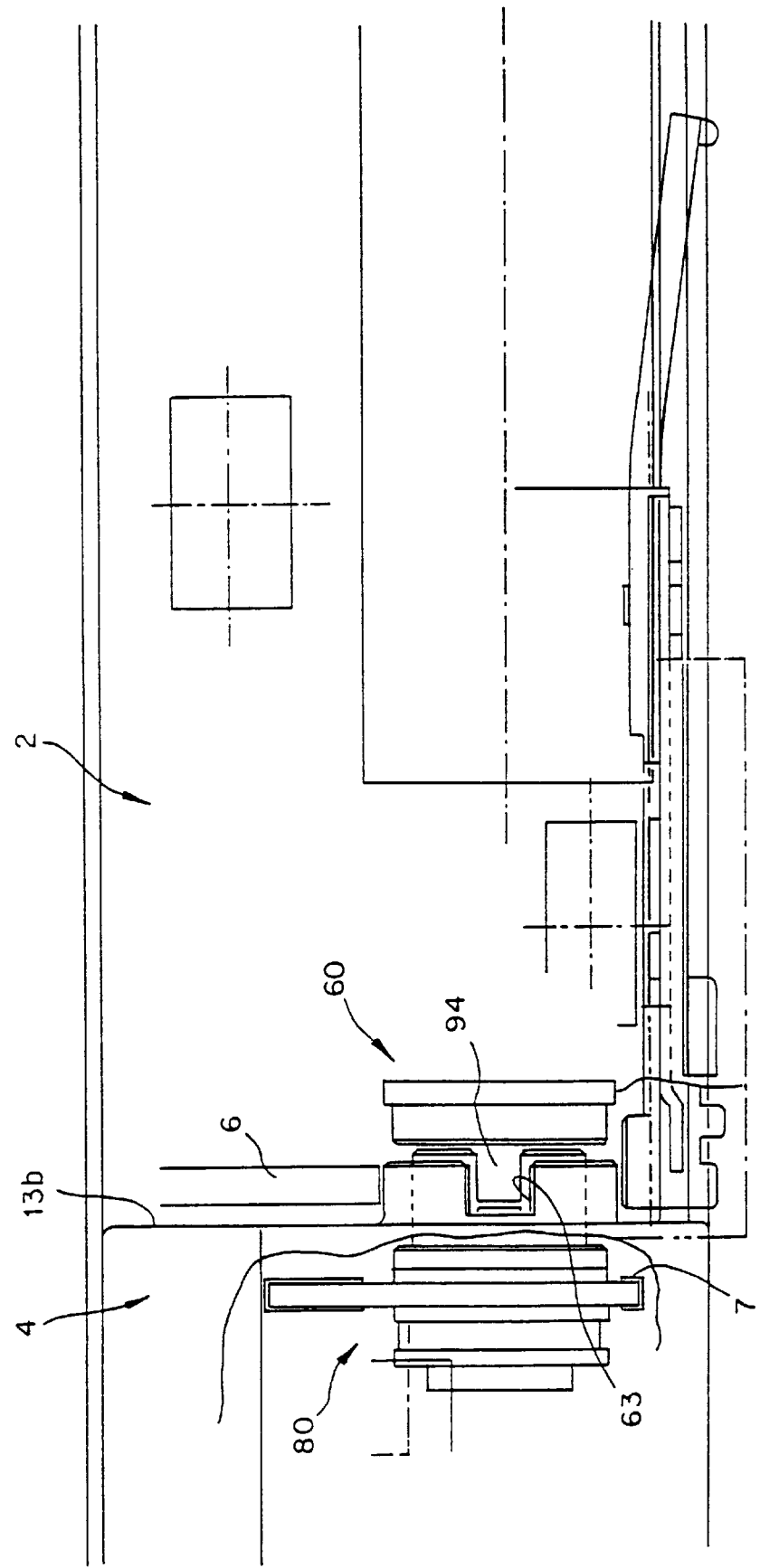
FIG. 33 is a view showing the hinge and the hinge pivot in engagement with each other in a different manner from FIG. 31.

FIG. 33 shows a first modification of the second embodiment related to the second hinge structure 15. In this case, the positional relation of the hinge pivot 60 and the hinge 80 is reversed as compared with the case of the above embodiment, that is, the hinge 80 is attached to the battery pack 4, and the hinge pivot 60 to the system body 2. Also, the hinge pivot 60 is formed with the joint protrusion 94, while the hinge 80 is provided with the joint groove 63. Since the construction, assembly, and attachment structure for other components have no special differences, a detailed description of those particulars is omitted.

In this arrangement, however, the state of engagement between the joint protrusion 94 of the hinge pivot 60 and the joint groove 63 of the hinge 80 never changes even when the battery pack 4 is rotated.

[Attachment and Connection of System Body 2 and Battery Pack 4]

In attaching the battery pack 4 to the system body 2, the lug 10 of the body 2 and the recess 11 of the pack 4 are held parallel to each other, and the lug 10 is pushed into the recess 11 by parallel movement so that the recessed fitting portions 17a and 17b on the opposite sides of the underside of the lug 10 and the rotating electrode 20 and the hinge pivot 60 on the recess-side end faces 13a and 13b of the battery pack 4 are aligned with one another. Thereupon, the rotating electrode 20 is fitted into the U-shaped groove 43 in a manner such that its electrodes 21 cause the U-shaped electrodes 42a and 42b of the rotating connector 40 to spread out. Since the electrodes 42a and 42b have spring elasticity, they are guided by the partition walls 48 in movement along the guide slots 49 as they are spread out.

As a result, the power lines and signal lines on the sides of the system body 2 and the battery pack 4 are connected to one another, and the peripheral surface of the rotating support portion 24 of the rotating electrode 20 is rotatably supported on the semicircular bottom portion (bearing portion) of the U-shaped groove 43 of the rotating connector 40. Thus, the first hinge structure 14 is detachable and rotatable around the pack rotation axis "a". On the other hand, the hinge pivot 60 is connected in a manner such that its joint groove 63 is in engagement with the joint protrusion 94 of the hinge 80 on the side of the lug 10. Since the joint protrusion 94 of the hinge 80 is rotatable, the second hinge structure 15 is also detachable and rotatable around the pack rotation axis "a".

In this manner, the battery pack 4 can be attached to or detached from the system body 2 by simple operation such that it is moved vertically with respect to the underside of the body 2. The battery pack 4 can be easily attached with a wide view when positioned vertical with respect to the system body 2. The battery pack 4 attached to the system body 2 can be positioned horizontal if necessary. The rotating electrode 20 and the rotating connector 40 allow the battery pack 4 to be inclined at a desired angle to the system body 2 without the possibility of its cutting the power supply or signals. In shifting the position of the battery pack 4 to the horizontal or vertical position, moreover, the fixing plate 81 and the friction plate 82 of the hinge 80 produce a feeling of a click or good operating response, and the pack 4 can be securely held in the position.

In removing the battery pack 4 from this position, the pack 4 is shifted to the vertical position so that the joint groove 63 extends in the vertical direction, and is then lifted away from the system body 2 while keeping the vertical position. After this operation, the hinge pivot 60 and the rotating electrode 20 can be easily disengaged from the recessed fitting portions 17a and 17b.

In the arrangement of the first modification related to the second hinge structure 15, however, the state of engagement between the joint protrusion 94 of the hinge pivot 60 and the joint groove 63 of the hinge 80 never changes even when the battery pack 4 is rotated. Accordingly, the battery pack 4 can be attached or detached in any desired angular position between the horizontal and vertical positions.

[Construction of Sliding Door 110]

Figure 34:
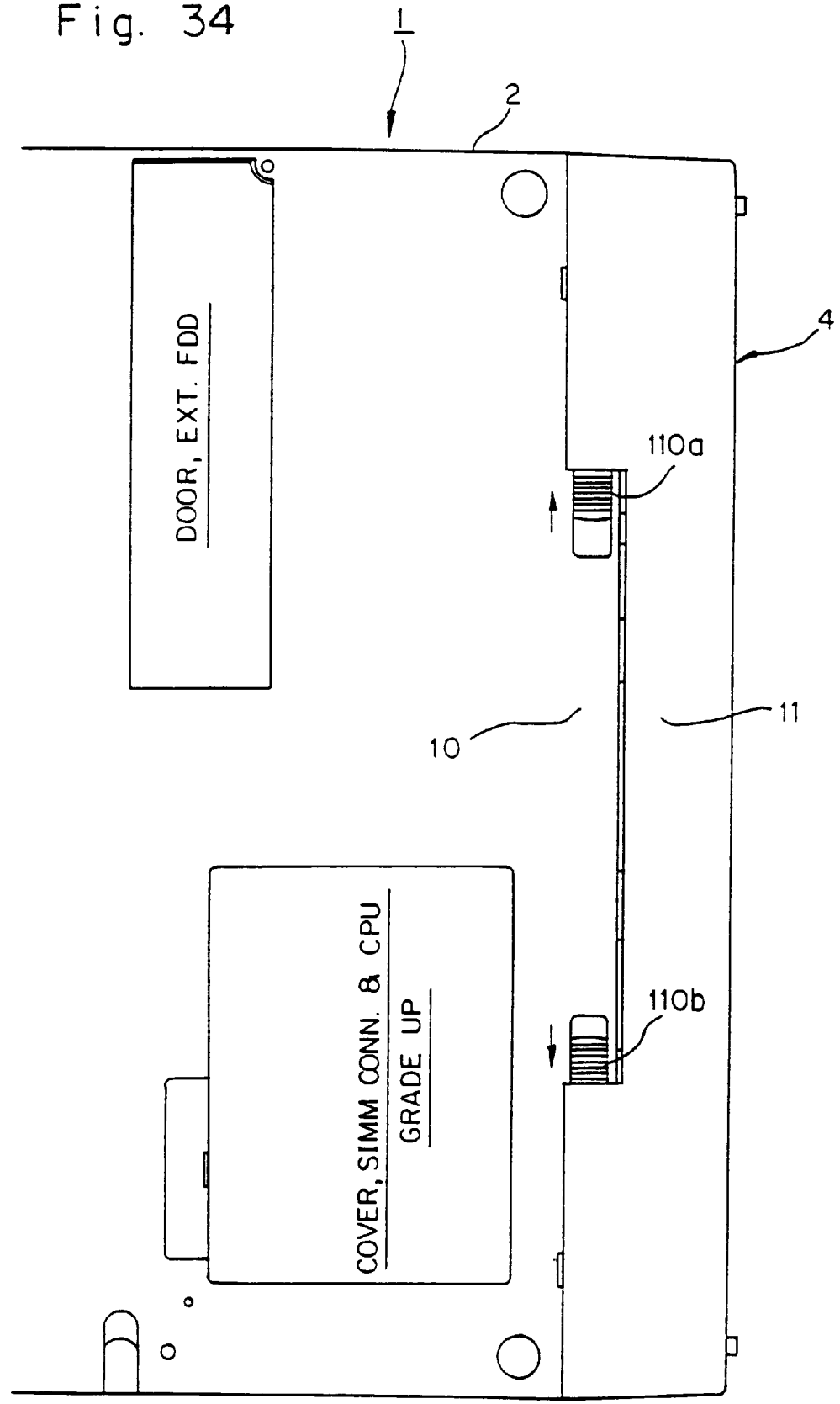
FIG. 34 is a plan view showing (part of) the underside of a system body shown in FIG. 7.
Figure 35:
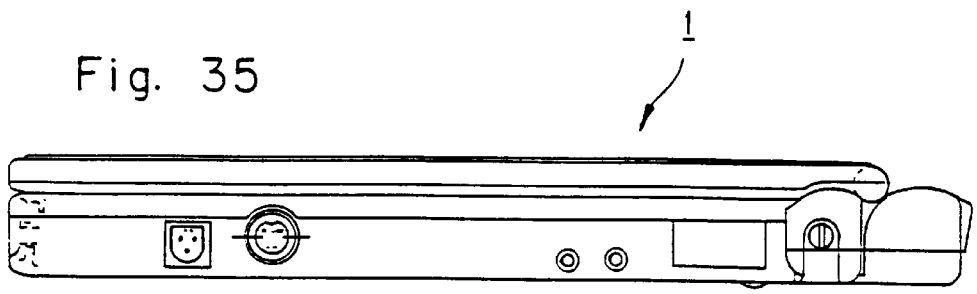
FIG. 35 is a side view of the portable computer shown in FIG. 4.
Figure 36:
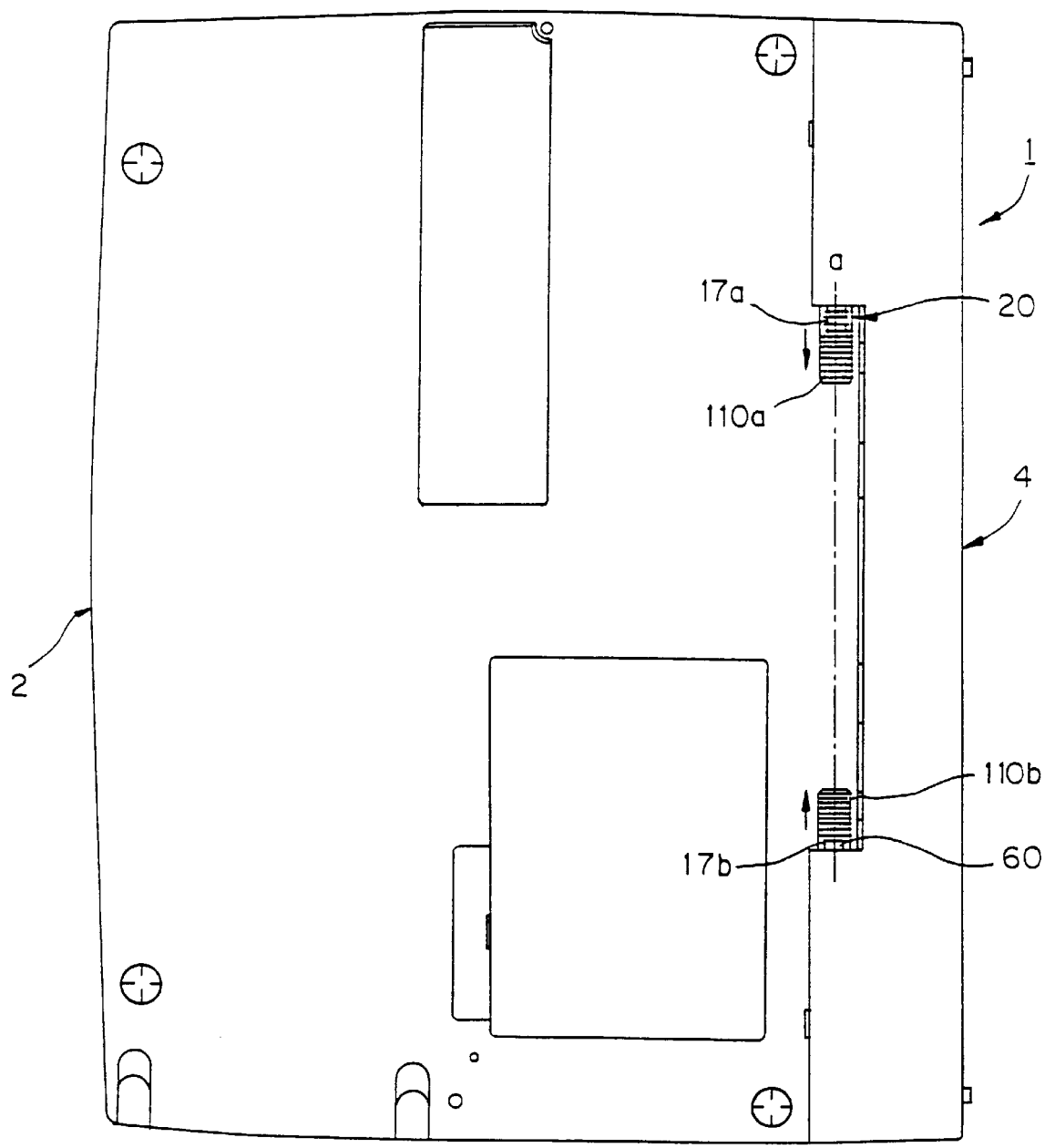
FIG. 36 is a plan view showing the underside of the system body of the computer of FIG. 35.

When the battery pack 4 is attached to the system body 2 in the aforesaid manner, the first and second hinge structures 14 and 15 may possibly be disconnected to cause the battery pack 4 to come off. As shown in FIGS. 6, 34 and 36, therefore, the recessed fitting portions 17a and 17b are provided with sliding doors 110a and 110b, respectively, which prevent the battery pack 4 from coming off and facilitate the attachment and detachment of the pack 4. FIGS. 34 and 36 show open and closed states, respectively.

Figure 37:
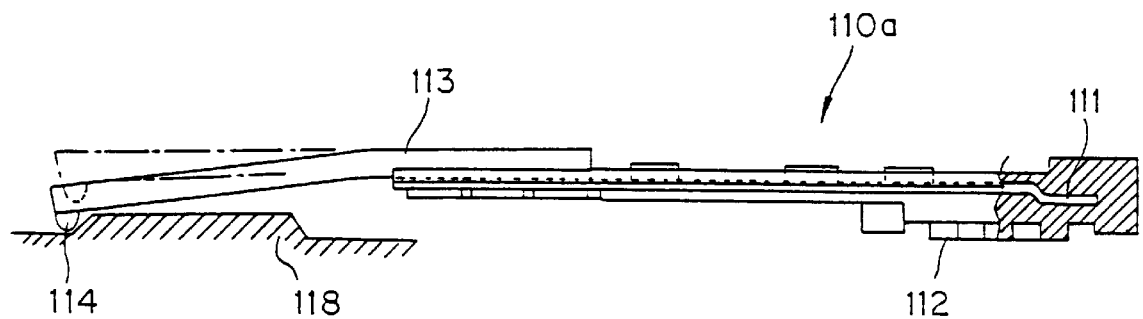
FIG. 37 is a front view of the sliding door of FIG. 14.
Figure 38:
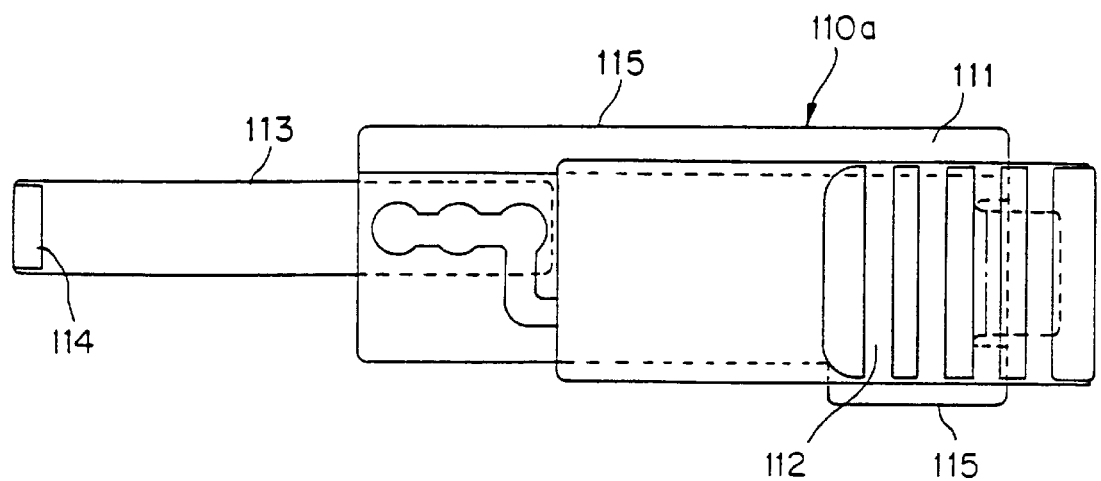
FIG. 38 is a plan view of the sliding door of FIG. 37.

Basically, the sliding doors 110a and 110b are constructed in the same manner except for some difference in the sliding stroke. Each door 110 is an elongate, flat synthetic resin product which is formed integrally with a thin, high-rigidity metallic plate 111 as an insert therein. As shown in FIGS. 37 and 38, a nail catch portion 112 is attached to the inside of the door 110 on one end side with respect to the transverse direction, while a hook portion 113 extends longer than the thin metallic plate 111 on the other end side. The distal end of the hook portion 113 is biased so as to be situated below the level of the metallic plate 111. A hook projection 114 is formed integrally on the underside of the distal end portion of the hook portion 113. The thin metallic plate 111 projects on both sides of the nail catch portion 112, thus forming slide portions 115.

Figure 39:
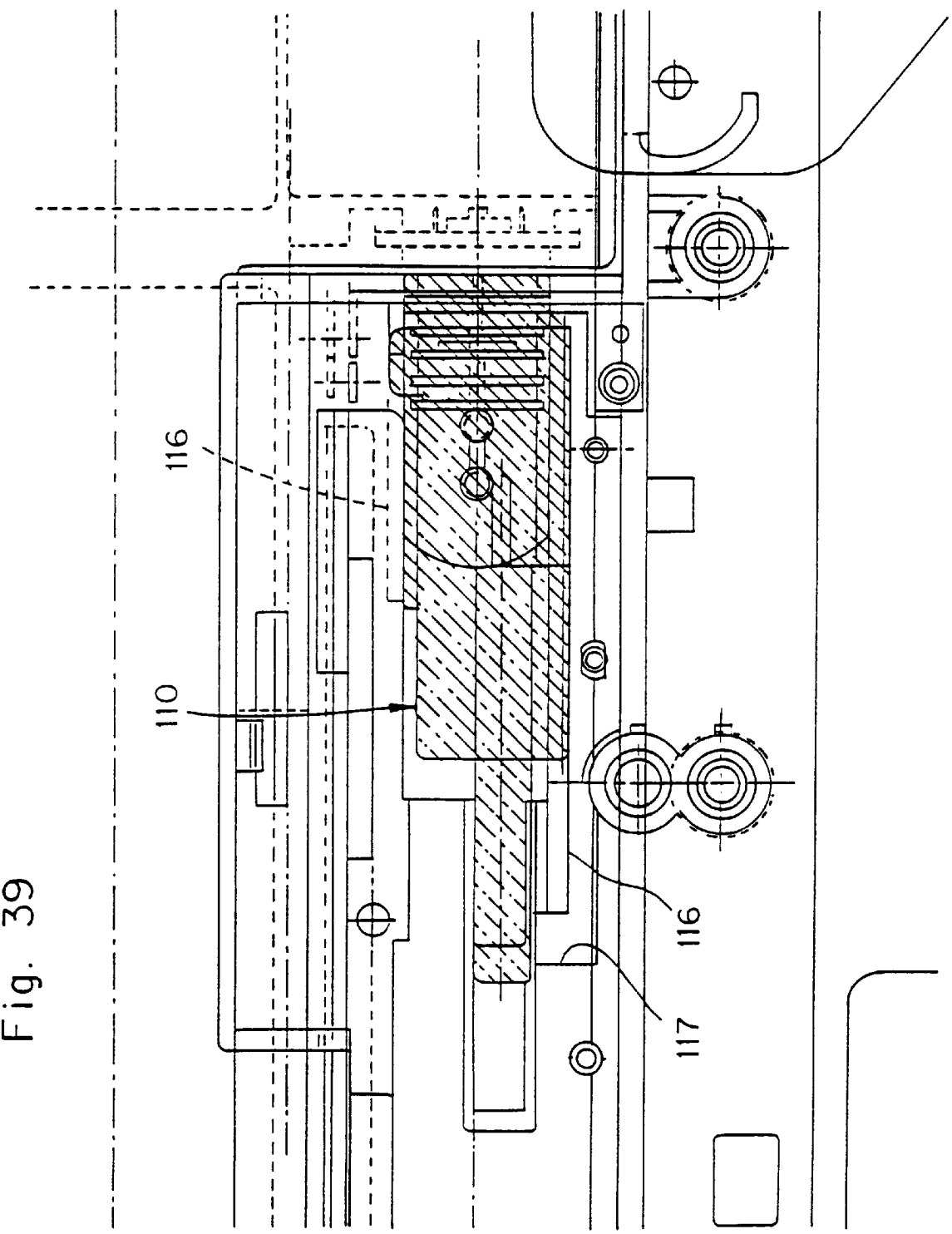
FIG. 39 is a view showing the sliding door of FIG. 38 attached to the system of the system body of the portable computer of FIG. 4.

As shown in FIG. 39, each sliding door 110 is designed so that its slide portions 115 are fitted individually in slide grooves 116, which are formed extending along the peripheral edges of the recessed fitting portion 17a or 17b of the lug 10, so as to be movable in the transverse direction. Also, the door 110 is fitted in a shallow fitting groove 117 which is formed on the inside of the lug 10, surrounding the fitting portion 17a or 17b, and is mounted in position such that the surface of the nail catch portion 112 is substantially flush with the underside of the lug 10. In FIG. 39, the area corresponding to the sliding door 110 is hatched by dashed line.

Figure 40:
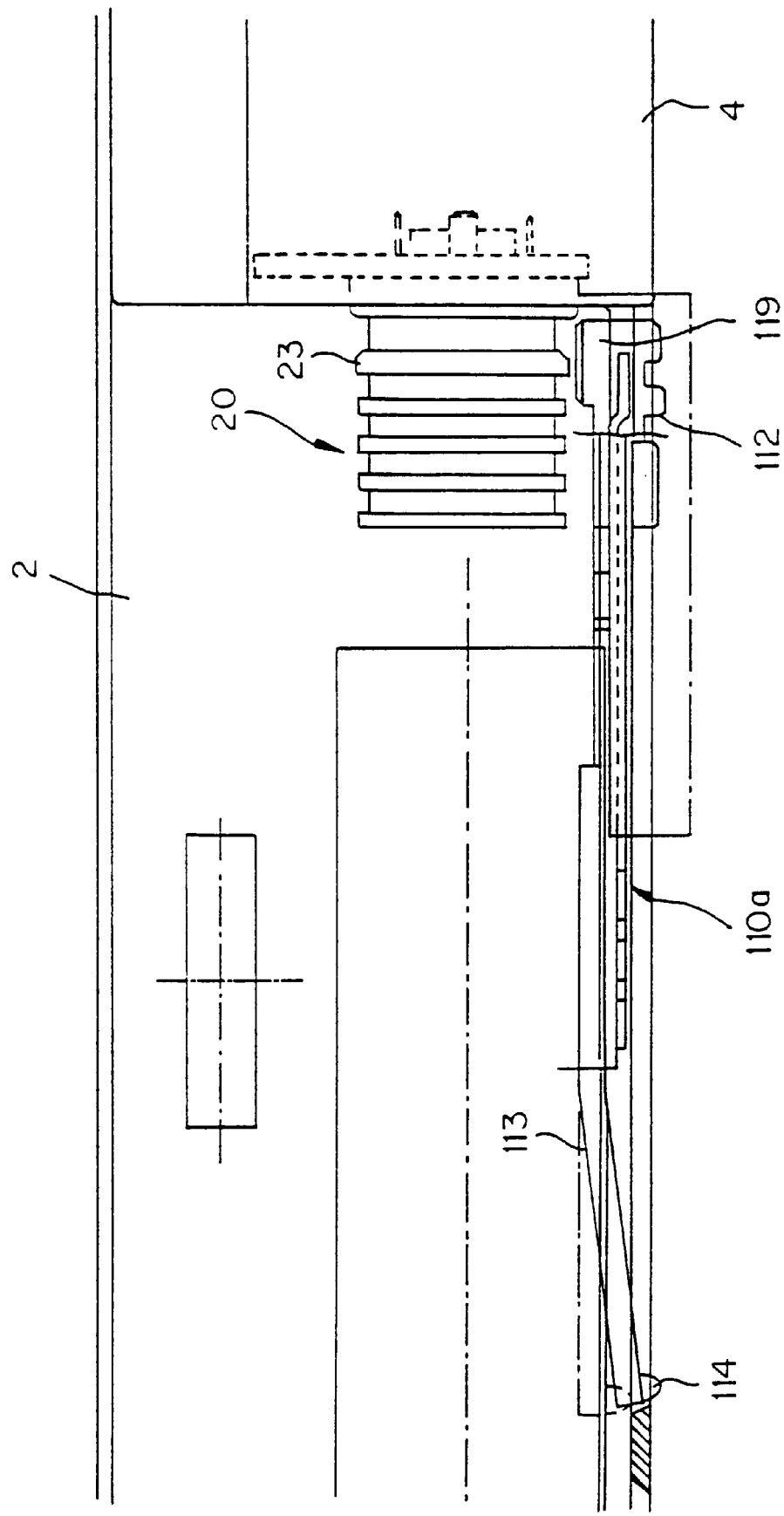
FIG. 40 is a front view showing the sliding door and rotating electrode attached to the system body of the computer of FIG. 4.

Formed on the inside of the lug 10, moreover, is a hook anchoring portion 118 which have slopes at its opposite ends, individually, as shown in FIGS. 37 and 40. As the sliding door 110 is opened or closed, its hook projection 114 slides on the hook anchoring portion 118. When the door 110 is open or closed, the projection 114 is caused to engage one of the slopes of the anchoring portion 118 by the bias of the hook portion 113, thereby preventing the door 110 from being moved unexpectedly. However, this latched state can be easily canceled by applying a predetermined or greater force to the nail catch portion 112 in the sliding direction so that the hook projection 114 rides across the slope of the hook anchoring portion 118.

[Weight Supporting Structure by Sliding Doors 110]

Figure 41:
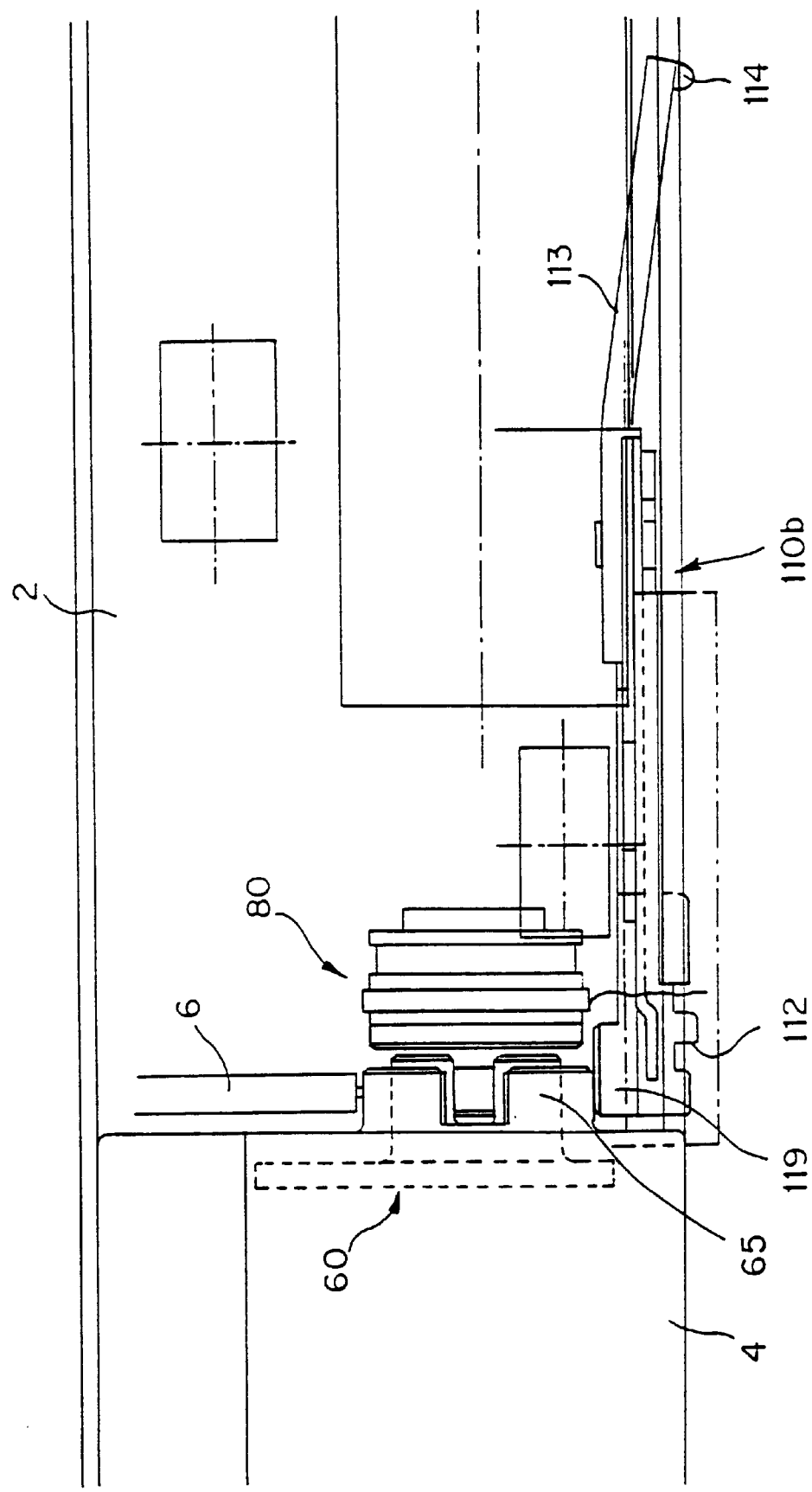
FIG. 41 is a front view showing the sliding door, hinge pivot, and hinge attached to the system body of the computer of FIG. 4.
Figure 43:
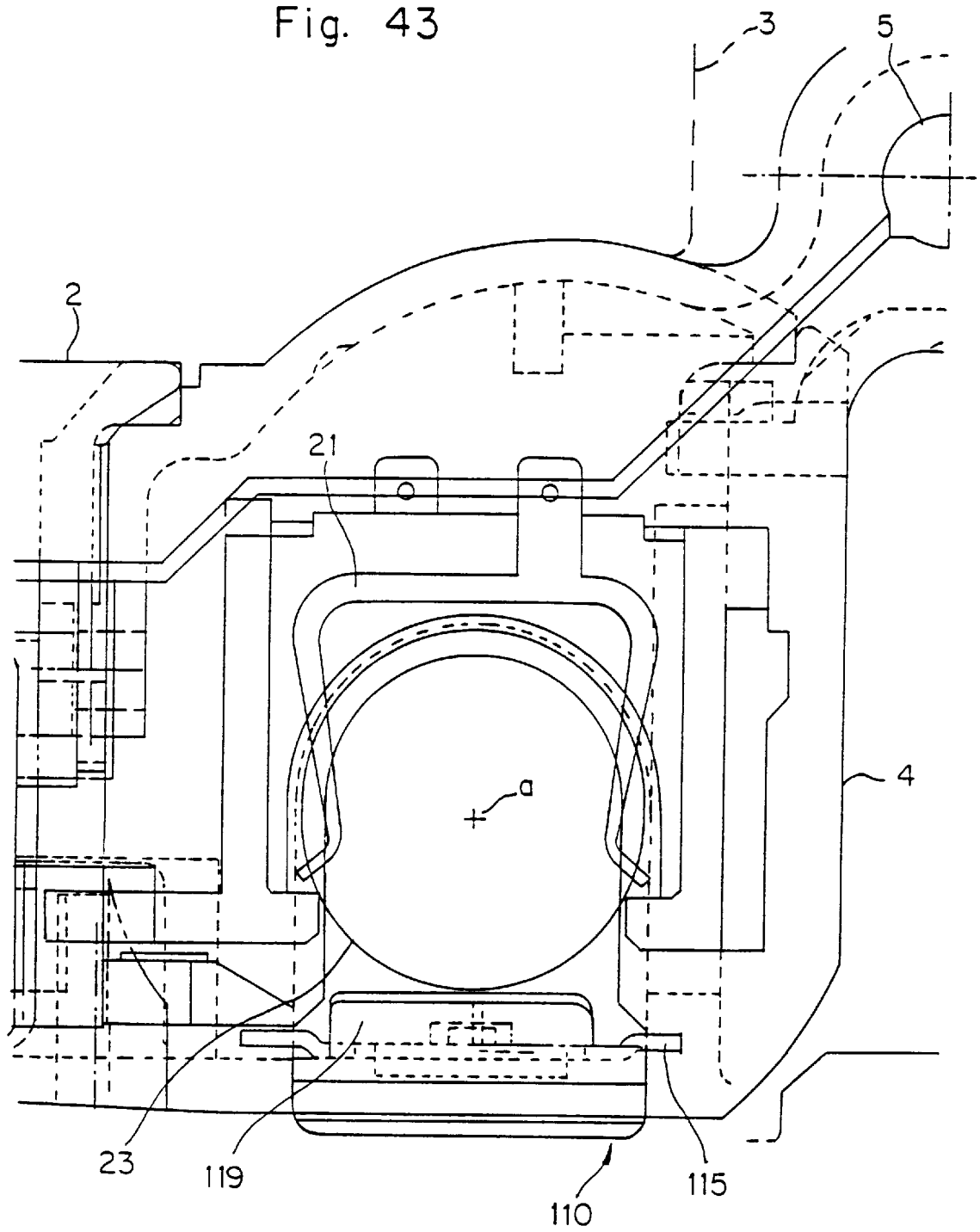
FIG. 43 is a side view showing the rotating electrode, rotating connector, and sliding door attached to the system body of the computer of FIG. 4.

FIGS. 40 and 41 perspectively shows the relative positions of the rotating electrode 20 and the sliding door 110a and the relationship between the hinge pivot 60 and the sliding door 110b, respectively. Each of the doors 110a and 110b projects inward from the nail catch portion 112 on the distal end side, thus forming a bearing surface 119. When the sliding door 110a is closed after the battery pack 4 is attached to the system body 2, the bearing surface 119 comes into contact with the collar 23 of the rotating electrode 20, as shown in FIG. 43. The weight of the battery pack 4 is transmitted through the collar 23 to be supported by the body casing 6 without acting on the joint between the rotating electrode 20 and the rotating connector 40. In this case, the sliding door 110, which is expected to support the weight, is never deformed, since it is reinforced with the high-rigidity metallic plate 111 inserted therein.

When the sliding door 110b is closed, its bearing surface 119 comes into contact with and supports the projecting rib 65 which serves to position the joint portion 62 of the hinge pivot 60, as shown in FIG. 42. Accordingly, the weight of the battery pack 4, which is transmitted through the joint portion 62 to the rib 65, is supported on the side of the body casing 6.

Thus, the first and second hinge structures 14 and 15, which detachably connect the system body 2 and the battery pack 4, can enjoy a stable connection with each other and improved durability.

Figure 44A:
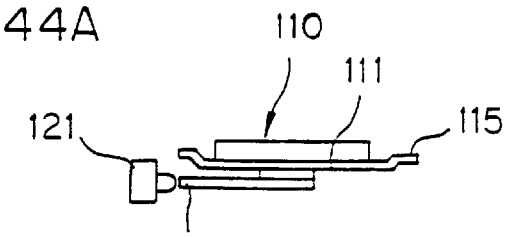
FIG. 44A is a plan view of a sliding door different from the one shown in FIG. 14.
Figure 44B:
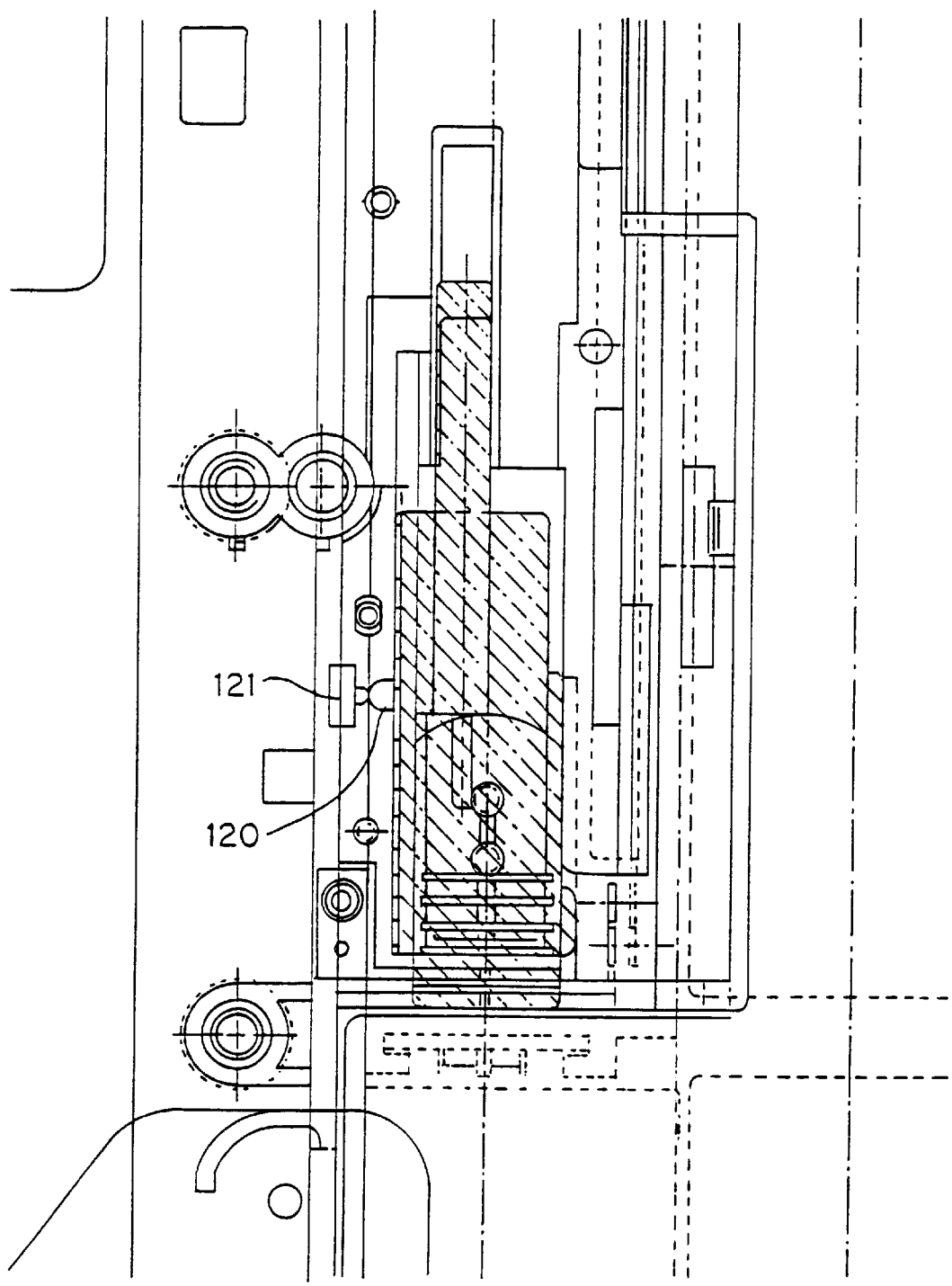
FIG. 44B is a view showing the sliding door of FIG. 44A attached to the system of the system body of the portable computer of FIG. 4.

FIGS. 44A and 44B show another modification (a second modification) of the second embodiment related to the sliding door 110. A projection 120 is formed on a synthetic resin portion of the sliding door 110, and a power switch 121 is located in the path of transfer of the projection 120. Thus, when the door 110 is closed after the battery pack 4 is attached to the system body 2, the power switch 121 is turned on, whereupon the rotating electrode 20 and the rotating connector 40 are connected electrically to each other. When the sliding door 110 is opened, the switch 121 is turned off, so that the electrical connection between the electrode 20 and the connector 40 is cut off before they are separated from each other. In the case where the power switch 121 is used in this manner, the rotating connector 40 need not be provided with the U-shaped electrodes 42a for the power supply.

[Position of Pack Rotation Axis "a"]

As shown in FIG. 45, the pack rotation axis "a" is situated as deep and low as possible with respect to the end faces 12a and 12b of the lug 10 of the system body 2. Thus, the position of the axis "a" is remoter from the system body 2 than the position of the central axis 121 of one of the two rows of the double-rowed batteries 8 in the battery pack 4, which is nearer to the system body 2, and also is as near to the base of the system body 2 as possible.

Figure 46:
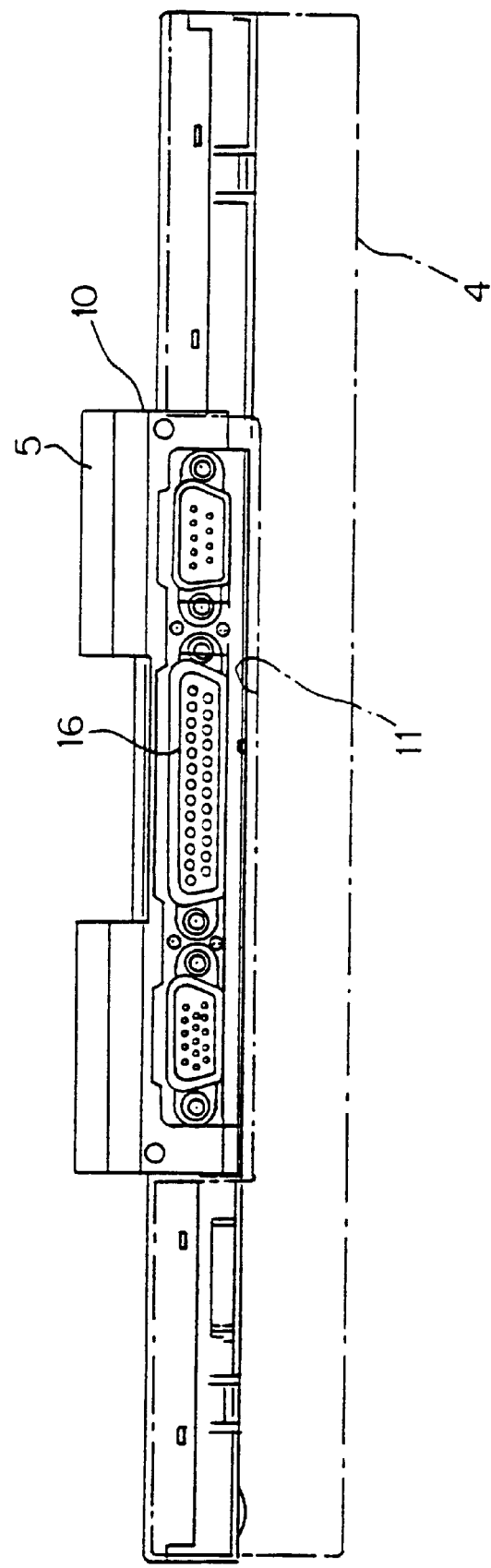
FIG. 46 is a view showing the rear face of the system body of the portable computer shown in FIG. 4.

Thus, when the battery pack 4 is in the horizontal position, it conceals the jack 16 arranged on the rear face of the lug 10 so that the jack 16 is not seen from outside. When the pack 4 is rotated and shifted to the vertical position, however, its recess 11 recedes wide from the rear face of the lug 10 of the system body 2, so that the jack 16 and its surrounding area are exposed (FIG. 46). In consequence, the jack 16 can be easily connected with a connector of some other equipment.

[Other Modifications]

The core fixing shaft 27 of the rotating electrode 20 may be replaced with a screw-nut mechanism which penetrates and tightens the core 22 and the collar 23.

In the arrangement of the present embodiment described above, the recessed fitting portions 17a and 17b are formed individually at the opposite end portions of the lug 10, and the rotating electrode 20 and the hinge pivot 60 are attached to the fitting portions 17a and 17b, respectively, by parallel movement. However, the hinge pivot 60 and the hinge 80 can be connected even though they are in somewhat skew position. Therefore, the recessed fitting portion 17a and the sliding door 110a may be provided only on the side of the rotating electrode 20 so that the electrode 20 can be mounted after previously joining the hinge pivot 60 and the hinge 80 with the battery pack 4 tilted, in attaching the pack 4 to the system body 2.

Figure 47:
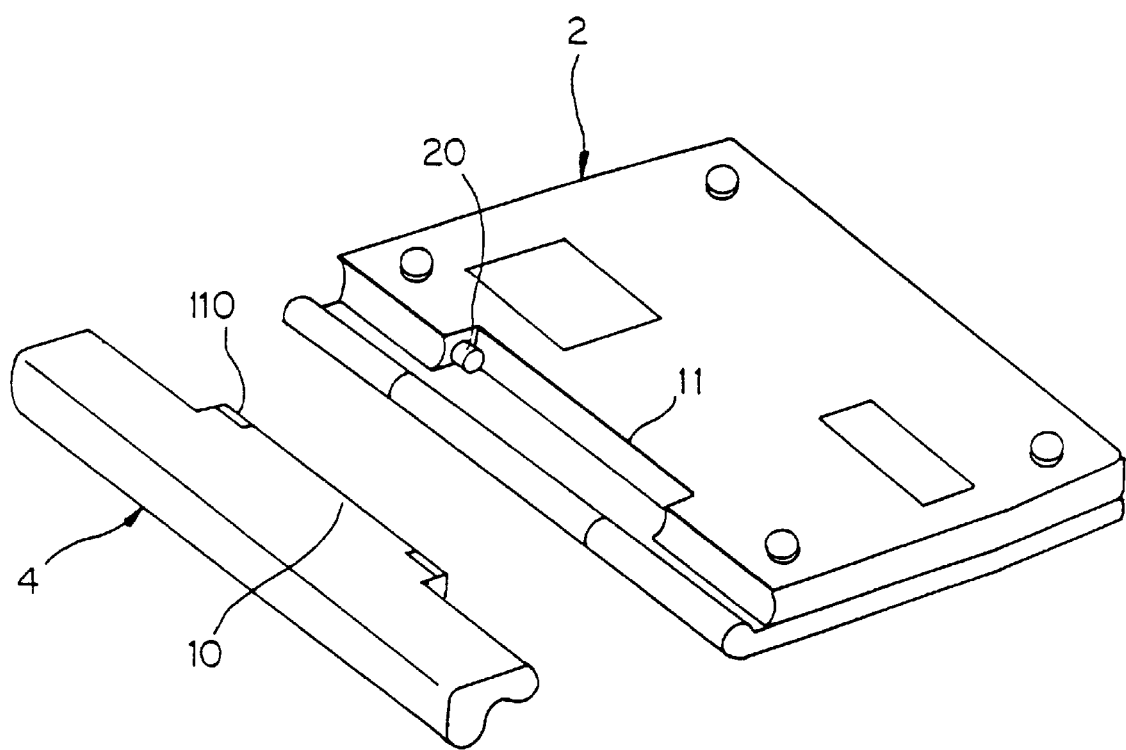
FIG. 47 is a view showing the underside of the portable computer of FIG. 7.

According to the present embodiment, moreover, the system body 2 and the battery pack 4 are formed with the lug 10 and the recess 11, respectively. As shown in FIG. 47, in contrast with this, the battery pack 4 and the system body 2 may be formed with the lug 10 and the recess 11, respectively. The rotating electrode 20, rotating connector 40, hinge pivot 60, and hinge 80 are constructed substantially in the same manner.

In the arrangement described above, the lug 10 is provided with the recessed fitting portions 17a and 17b, and the recess 11 with the rotating electrode 20 and the hinge pivot 60. These relative locations may, however, be reversed.

Moreover, the recessed fitting portions 17a and 17b may be designed so as to be open in the horizontal direction. In this case, the sliding doors 110 which cover these fitting portions have an L-shaped cross section, as shown in FIGS. 48A and 48B, the recessed fitting portions 17a and 17b are covered by a vertical portion 122, and a horizontal portion 123 which appears on the rear face of the pack casing 7 (or body casing 6) is substituted for the nail catch portion 112. According to this arrangement, the fitting portions 17a and 17b can be concealed more securely, and the operativity is improved.

The positions where click is produced in the hinge 80 can be freely set depending on the number of U-shaped grooves 91 of the fixing plate 81. With this arrangement, the position of the battery pack 4 tilted against the system body 2 can be shifted in a plurality of stages between the horizontal and vertical positions.

What is claimed is:

1. A portable computer with a battery pack, in which said battery pack is attached to a rear edge of the system body of the portable computer by means of at least two hinge structures so that the battery pack extends along the rear edge of the system body and can rotate with respect to the system body about the axis of the battery pack, the battery being in contact with the system body of the portable computer along the length of the battery pack, said hinge structure is provided with a brake mechanism which applies a braking force on the rotational movement of the battery pack, and at least one of said hinge structures further provided with electrical connecting means for electrically connecting the system body and the battery pack, while one of the other hinge structures is provided with said brake mechanism.

2. The portable computer according to claim 1, wherein said hinge structure comprises a hinge provided with said brake mechanism and a hinge pivot having a connecting portion for engaging with the hinge.

3. The portable computer according to claim 2, wherein said hinge is fixed on the side of the system body and said hinge pivot is fixed on the side of the battery pack.

4. The portable computer according to claim 1, wherein said brake mechanism produces a braking force with friction.

5. The portable computer according to claim 1, wherein said brake mechanism comprises a fixing plate, a friction plate which comes into contact with the fixing plate to produce a friction force, and a spring member which causes the friction plate to press against the fixing plate with a predetermined force.

6. The portable computer according to claim 5, wherein said friction plate has a projection, and said fixing plate has a plurality of grooves at predetermined places on a circumference of a circle of which center is the rotation axis of the friction plate, thereby, said projection of the friction plate engages with any one of the grooves with click motion generated.

7. The portable computer according to claim 6, wherein said electrical connecting means comprise a first electrode mounted on the side of the battery pack, a second electrode mounted on the side of the system body, the first electrode for rotating relatively with respect to the second electrode while maintaining an electrically connected state between them.

8. The portable computer according to claim 7, wherein any one of said first and second electrodes which constitute said electrical connecting means is formed ring-shaped.

9. The portable computer according to claim 8, wherein any one of said first and second electrodes which constitute said electrical connecting means is made of a material having a spring elasticity.

10. A portable computer with a battery pack, said battery pack in contact with the system body of the portable computer along the length of the battery pack, said battery pack and said system body attached by means of at least two hinge structures so that the battery pack can rotate with respect to the system body about the axis of the hinge structures, and at least one of said hinge structures further provided with electrical connecting means for electrically connecting the system body and the battery pack, and one of the other hinge structures being provided with a brake mechanism.

11. A portable computer with a battery pack, in which said battery pack is attached to a rear edge of the system body of the portable computer by means of at least two hinge structures so that the battery pack extends along the rear edge of the system body and can rotate with respect to the system body about the axis of the battery pack, wherein only one of the at least two hinge structures is provided with electric connecting means, the electric connecting means including both a positive electrode and a negative electrode on said only one of the at least two hinge structures.

12. The portable computer according to claim 11, wherein the battery pack is in contact with the system body of the portable computer along the length of the battery pack.

13. The portable computer according to claim 11, wherein the electric connecting means includes a rotating electrode and a rotating connector.

* * * * *

UNITED STATES PATENT AND TRADEMARK OFFICE
CERTIFICATE OF CORRECTION

PATENT NO : 6,078,496
DATED : June 20, 2000
INVENTOR(S): Toshiaki OGUCHI et al.

It is certified that error appears in the above-identified patent and that said Letters Patent are hereby corrected as shown below:

Col. 15, line 14, after "battery" insert --pack--.
Col. 15, line 19, after "structures" and before "further" insert --is--.
Col. 16, line 3, after "pack," and before "a" insert --and--.
Col. 16, line 5, before "rotating" delete "for".

Signed and Sealed this

Twenty-fourth Day of April, 2001

Attest:

NICHOLAS P. GODICI

Attesting Officer

Acting Director of the United States Patent and Trademark Office